US012598084B2

(12) United States Patent
Zhu et al.

(10) Patent No.: US 12,598,084 B2
(45) Date of Patent: Apr. 7, 2026

(54) EXTERNAL AUTHENTICATION METHOD, COMMUNICATION APPARATUS, AND COMMUNICATION SYSTEM

(71) Applicant: Huawei Technologies Co., Ltd., Shenzhen (CN)

(72) Inventors: Qianghua Zhu, Beijing (CN); Wenfu Wu, Shanghai (CN); Qi Yao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 582 days.

(21) Appl. No.: 17/708,815

(22) Filed: Mar. 30, 2022

(65) Prior Publication Data

US 2022/0225095 A1 Jul. 14, 2022

Related U.S. Application Data

(63) Continuation of application No. PCT/CN2020/118283, filed on Sep. 28, 2020.

(30) Foreign Application Priority Data

Sep. 30, 2019 (CN) .......................... 201910938046.0

(51) Int. Cl.
| | |
|---|---|
| *H04W 8/18* | (2009.01) |
| *H04L 9/40* | (2022.01) |

(Continued)

(52) U.S. Cl.
CPC ............ *H04L 9/40* (2022.05); *H04L 63/0892* (2013.01); *H04W 8/20* (2013.01); *H04W 12/06* (2013.01)

(58) Field of Classification Search
CPC .... H04W 12/06; H04W 8/20; H04L 63/0892; H04L 9/40

(Continued)

(56) References Cited

U.S. PATENT DOCUMENTS

| | | | | |
|---|---|---|---|---|
| 9,521,606 | B1 * | 12/2016 | Costa .................... | H04L 63/083 |
| 2012/0191971 | A1 * | 7/2012 | Battistello ........... | H04L 63/0823 |
| | | | | 713/155 |

(Continued)

FOREIGN PATENT DOCUMENTS

| | | |
|---|---|---|
| CN | 109474927 A | 3/2019 |
| CN | 109788474 A | 5/2019 |

(Continued)

OTHER PUBLICATIONS

3GPP TS 23.501 V16.2.0, Sep. 2019, "3rd Generation Partnership Project; Technical Specification Group Services and System Aspects; System Architecture for the 5G System (5GS); Stage 2 (Release 16)," 389 pages.

(Continued)

*Primary Examiner* — Christopher B Robinson
(74) *Attorney, Agent, or Firm* — Conley Rose, P.C.

(57) ABSTRACT

An external authentication method to implement authentication of a terminal with external subscription, where the method includes: A mobility management network element obtains external authentication indication information. The mobility management network element sends a first request message to a terminal based on the external authentication indication information, where the first request message is used to request external authentication. The mobility management network element receives a first non-access stratum (NAS) message from the terminal. The mobility management network element sends related information of an external entity to an authentication server function network element based on the first NAS message, where the related information of the external entity is used to address the external entity, and where the external entity is configured to perform authentication on the terminal. The mobility management network element receives an external authentica- (Continued)

tion result from the authentication server function network element.

22 Claims, 10 Drawing Sheets

(51) Int. Cl.
  H04W 8/20 (2009.01)
  H04W 12/06 (2021.01)
(58) Field of Classification Search
  USPC .......................................................... 726/1
  See application file for complete search history.

(56) References Cited

U.S. PATENT DOCUMENTS

| | | | | |
|---|---|---|---|---|
| 2015/0105075 | A1* | 4/2015 | Yu ......................... | H04L 67/303 |
| | | | | 455/435.2 |
| 2017/0164185 | A1* | 6/2017 | Betti ..................... | H04W 8/183 |
| 2018/0316764 | A1* | 11/2018 | Ferreira Gomes ....... | G07C 5/02 |
| 2019/0098536 | A1 | 3/2019 | Qiao et al. | |
| 2019/0191309 | A1* | 6/2019 | Kweon ............ | H04M 15/8228 |
| 2019/0215895 | A1 | 7/2019 | Huang et al. | |
| 2020/0100173 | A1* | 3/2020 | Casati ..................... | H04L 63/08 |
| 2020/0127972 | A1* | 4/2020 | Aldossary ............. | H04L 63/029 |
| 2020/0153871 | A1 | 5/2020 | Lei et al. | |
| 2020/0186999 | A1* | 6/2020 | Jerichow ............... | H04W 12/04 |
| 2020/0259896 | A1* | 8/2020 | Sachs ................. | H04L 63/0428 |
| 2020/0374698 | A1 | 11/2020 | Ying et al. | |
| 2021/0297937 | A1* | 9/2021 | Baek ..................... | H04W 48/12 |

FOREIGN PATENT DOCUMENTS

| | | | |
|---|---|---|---|
| CN | 109842880 | A | 6/2019 |
| CN | 110062381 | A | 7/2019 |
| CN | 110167013 | A | 8/2019 |
| CN | 110167025 | A | 8/2019 |
| EP | 3657894 | A1 | 5/2020 |
| KR | 20180106998 | A | 10/2018 |
| WO | 2019017837 | A1 | 1/2019 |

OTHER PUBLICATIONS

3GPP TS 23.502 V16.2.0, Sep. 2019, "3rd Generation Partnership Project; Technical Specification Group Services and System Aspects; Procedures for the 5G System (5GS); Stage 2 (Release 16)," 525 pages.
3GPP TS 23.503 V16.2.0, Sep. 2019, "3rd Generation Partnership Project; Technical Specification Group Services and System Aspects; Policy and Charging Control Framework for the 5G System (5GS); Stage 2 (Release 16)," 104 pages.
3GPP TS 29.503 V16.1.0, Sep. 2019, "3rd Generation Partnership Project; Technical Specification Group Core Network and Terminals; 5G System; Unified Data Management Services;Stage 3 (Release 16)," 234 pages.
3GPP TS 33.501 v16.0.0, Sep. 2019, "3rd Generation Partnership Project; Technical Specification Group Services and System Aspects; Security architecture and procedures for 5G system (Release 16)," 196 pages.
Ericsson, "Support of piggybacking of NAS SM message while configuring a DRB," 3GPP TSG-SA WG2 Meeting #130, S2-1901089, Jan. 21-25, 2019, Kochi, India, 12 pages.
Huawei et al., "Solution for NPN network access via PLMN," 3GPP TSG SA WG3 (Security) Meeting #94, S3-190493, Jan. 28-Feb. 1, 2019, Kechi (India), 4 pages.
Huawei et al., "EAP based slice-specific authentication," 3GPP TSG-SA WG3 Meeting #96, S3-192726,Wroclaw (Poland), Aug. 26-30, 2019, 3 pages.
3GPP TR 23.734 V0.3.0, Oct. 2018, "3rd Generation Partnership Project; Technical Specification Group Services and System Aspects; Study on 5GS Enhanced support of Vertical and LAN Services (Release 16)," 97 pages.
Motorola Mobility, Lenovo, Solution for network slice authentication and authorisation, SA WG2 Meeting #128bis, S2-188261, Sophia Antipolis, France, Aug. 20-24, 2018, total 5 pages.
Ericsson, ZTE Corporation, China Mobile, Clarifications to: Protection at the network or transport layer, Authorization and authentication between network functions and the NRF, 3GPP TSG-SA WG3 Meeting #91Bis, S3-182035, La Jolla (US), May 21-25, 2018, total 3 pages.

* cited by examiner

EXTERNAL AUTHENTICATION METHOD, COMMUNICATION APPARATUS, AND COMMUNICATION SYSTEM

CROSS-REFERENCE TO RELATED APPLICATION

This is a continuation of International Patent Application No. PCT/CN2020/118283, filed on Sep. 28, 2020, which claims priority to Chinese Patent Application No. 201910938046.0, filed on Sep. 30, 2019. The disclosures of the aforementioned applications are hereby incorporated by reference in their entireties.

TECHNICAL FIELD

This application relates to the field of communication technologies, and in particular, to an external authentication method, a communication apparatus, and a communication system.

BACKGROUND

A non-public network (NPN) is a non-public 5th generation (5G) mobile communication system (55G) network. Different from a public network, the NPN serves specific users. The NPN can be well converged with an industrial Internet to provide a dedicated access network for vertical industries. Terminals in non-vertical industries are restricted from attempting to access a dedicated base station or a dedicated frequency band, to ensure that customers in the vertical industries exclusively use resources. In addition, the NPN can provide support for local area network (LAN) services, and can meet requirements of some enterprises, residences, schools, and the like for a reliable and stable private network.

There are the following two types of NPNs: 1. Public network integrated NPN: The network relies on network functions provided by a public land mobile network (PLMN). 2. Standalone NPN: The network does not rely on the network functions provided by the PLMN. To ensure that subscription data of a user served by the NPN is independent of an operator, or to use legacy subscription data of a user which is engaged before NPN deployment, the NPN allows a terminal with external subscription to access the network. That is, user subscription of the terminal is owned by an external entity independent of the NPN, and the NPN allows such terminals to access the network using external subscription.

However, currently, there is no related solution to implementing authentication of a terminal with external subscription in the NPN.

SUMMARY

Embodiments of this application provide an external authentication method, a communication apparatus, and a communication system, to implement authentication of a terminal with external subscription.

According to a first aspect, this application provides an external authentication method. The method includes: A mobility management network element obtains external authentication indication information. The mobility management network element sends a first request message to a terminal based on the external authentication indication information, where the first request message is used to request external authentication. The mobility management network element receives a first non-access stratum (NAS) message from the terminal. The mobility management network element sends related information of an external entity to an authentication server function network element based on the first NAS message, where the related information of the external entity is used to address the external entity, and the external entity is configured to perform authentication on the terminal. The mobility management network element receives an external authentication result from the authentication server function network element.

According to the foregoing method, the mobility management network element enables the external authentication based on the obtained external authentication indication information, and obtains the external authentication result from a trusted third party (namely, the external entity), to implement authentication of the terminal with external subscription in a network in which the mobility management network element is located.

In a first possible design of the first aspect, that a mobility management network element obtains external authentication indication information includes: The mobility management network element receives the external authentication indication information from the terminal; the mobility management network element receives the external authentication indication information from the authentication server function network element; or the mobility management network element receives the external authentication indication information from a data management network element.

With reference to the first possible design of the first aspect, in a second possible design, that the mobility management network element obtains the external authentication indication information from the terminal includes: The mobility management network element receives a registration request message from the terminal, where the registration request message includes the external authentication indication information.

With reference to the first possible design of the first aspect, in a third possible design, the method further includes: The mobility management network element receives a registration request message from the terminal. If integrity protection authentication performed by the mobility management network element on the registration request message fails, that the mobility management network element obtains the external authentication indication information from the terminal includes: The mobility management network element sends an identity request message to the terminal. The mobility management network element receives an identity response message from the terminal, where the identity response message includes the external authentication indication information.

With reference to the second or the third possible design, in a fourth possible design, before the mobility management network element sends the first request message to the terminal, the method further includes: The mobility management network element determines that there is no valid security context of the terminal locally.

With reference to the first possible design of the first aspect, in a fifth possible design, the method further includes: The mobility management network element receives a registration request message from the terminal. If the mobility management network element determines that there is no valid security context of the terminal locally, that the mobility management network element obtains the external authentication indication information from the authentication server function network element includes: The mobility management network element sends a terminal authentication request message to the authentication server function network element. The mobility management network element receives a terminal authentication response message from the authentication server function network element, where the terminal authentication response message includes the external authentication indication information.

With reference to any one of the second to the fifth possible designs, in a sixth possible design, the first NAS message includes a third-party identifier, and the third-party identifier is used to identify the external entity.

With reference to the sixth possible design, in a seventh possible design, the related information of the external entity includes a communication address of the external entity or the third-party identifier.

With reference to the seventh possible design, in an eighth possible design, if the related information of the external entity includes the communication address of the external entity, the method further includes: The mobility management network element determines the communication address of the external entity based on the third-party identifier.

With reference to any one of the second to the eighth possible designs, in a ninth possible design, the method further includes: The mobility management network element receives an anchor key from the authentication server function network element, where the anchor key is used to set up a security context of the terminal.

With reference to the first possible design, in a tenth possible design, that the mobility management network element receives the external authentication indication information from a data management network element includes: The mobility management network element sends a subscription obtaining request message to the data management network element. The mobility management network element receives a subscription obtaining response message from the data management network element, where the subscription obtaining response message includes the external authentication indication information.

With reference to the tenth possible design, in an eleventh possible design, the method further includes: The mobility management network element receives a third-party identifier from the data management network element, where the third-party identifier is used to identify the external entity.

With reference to the eleventh possible design, in a twelfth possible design, the first request message includes the third-party identifier.

With reference to the twelfth possible design, in a thirteenth possible design, the first NAS message includes the third-party identifier.

With reference to any one of the first aspect or the first to the thirteenth possible designs, in a fourteenth possible design, the first NAS message includes an external authentication request, and the external authentication request is used to request the external entity to perform authentication on the terminal.

With reference to any one of the first aspect or the first to the fourteenth possible designs, in a fifteenth possible design, if the external authentication result is that the external authentication succeeds, the mobility management network element configures, for the terminal, third-party service information corresponding to the external entity.

With reference to any one of the first aspect or the first to the fifteenth possible designs, in a sixteenth possible design, the external authentication indication information is used to indicate to perform external authentication, and the external authentication indication information includes any one or more of the following: a registration type value that is set to external registration, an indication used to indicate that the terminal supports the external authentication (a user equipment (UE) capability indication), an information element used to indicate to perform external authentication, an external authentication security parameter, or an identity of the terminal that is set to a special value.

With reference to any one of the sixth to the eighth possible designs or any one of the eleventh to the thirteenth possible designs, in a seventeenth possible design, the third-party identifier includes any one or more of the following: a network access identifier NAI, a data network name (DNN), a service provider identifier (SP-ID), or single network slice selection assistance information (S-NSSAI).

According to a second aspect, this application provides an external authentication method. The method includes: A terminal sends a registration request to a mobility management network element, where the registration request includes external authentication indication information, and the external authentication indication information is used to indicate to perform external authentication. The terminal receives a first request message from the mobility management network element, where the first request message is used to request the external authentication. The terminal sends a first non-access stratum (NAS) message to the mobility management network element. The terminal receives a second NAS message for the first NAS message from the mobility management network element, where the second NAS message includes an external authentication result.

According to the foregoing method, the terminal sends the external authentication indication information to the mobility management network element; the mobility management network element enables the external authentication based on the obtained external authentication indication information, obtains the external authentication result from a trusted third party (namely, an external entity), and provides the external authentication result for the terminal, to enable the terminal to learn that the terminal can access a network in which the mobility management network element is located, and implement authentication of the terminal with external subscription in the network in which the mobility management network element is located.

In a first possible design of the second aspect, the first NAS message includes a third-party identifier, and the third-party identifier is used to identify an external entity that is to perform authentication on the terminal.

With reference to the first possible design, in a second possible design, the third-party identifier includes any one or more of the following: a network access identifier (NAI), a data network name (DNN), a service provider identifier (SP-ID), or single network slice selection assistance information (S-NSSAI).

With reference to any one of the second aspect or the first to the third possible designs, in a fourth possible design, the first NAS message includes an external authentication request, and the external authentication request is used to request the external entity to perform authentication on the terminal.

With reference to any one of the second aspect or the first to the fourth possible designs, in a fifth possible design, the method further includes: The terminal receives an identity request message from the mobility management network element. The terminal sends an identity response message to the mobility management network element, where the identity response message includes the external authentication indication information.

With reference to any one of the second aspect or the first to the fifth possible designs, in a sixth possible design, the external authentication indication information includes any one or more of the following: a registration type value that is set to external registration, an indication used to indicate that the terminal supports the external authentication (a UE capability indication), an information element used to indicate to perform external authentication, an external authentication security parameter, or an identity of the terminal that is set to a special value.

According to a third aspect, this application provides an external authentication method. The method includes: A data management network element obtains an identity of a terminal. The data management network element determines, based on subscription data of the terminal, that external authentication needs to be performed on the terminal. The data management network element sends external authentication indication information to a mobility management network element, where the external authentication indication information is used to indicate to perform external authentication on the terminal.

According to the foregoing method, the data management network element sends the external authentication indication information to the mobility management network element; the mobility management network element enables the external authentication based on the obtained external authentication indication information, and obtains an external authentication result from a trusted third party (namely, an external entity), to implement authentication of the terminal with external subscription in a network in which the mobility management network element is located.

In a first possible design of the third aspect, that a data management network element obtains an identity of a terminal includes: The data management network element receives the identity of the terminal from an authentication server function network element; or the data management network element receives the identity of the terminal from the mobility management network element.

With reference to the third aspect or the first possible design, in a second possible design, that the data management network element determines, based on subscription data of the terminal, that external authentication needs to be performed on the terminal includes: The data management network element determines, based on an external service authentication indication in the subscription data of the terminal, that the external authentication needs to be performed on the terminal.

With reference to the third aspect, the first possible design, or the second possible design, in a third possible design, that the data management network element sends external authentication indication information to a mobility management network element includes: The data management network element sends the external authentication indication information to the mobility management network element through the authentication server function network element.

With reference to any one of the third aspect or the first to the third possible designs, in a fourth possible design, the data management network element further sends a third-party identifier to the mobility management network element, where the third-party identifier is used to identify an external entity that is to perform authentication on the terminal.

With reference to the fourth possible design, in a fifth possible design, that the data management network element further sends a third-party identifier to the mobility management network element includes: The data management network element sends the external authentication indication information to the mobility management network element through the authentication server function network element.

With reference to the fourth or the fifth possible design, in a sixth possible design, the third-party identifier includes any one or more of the following: a network access identifier NAI, a DNN, an SP-ID, or S-NSSAI.

With reference to any one of the third aspect or the first to the sixth possible designs, in a seventh possible design, the external authentication indication information includes an information element used to indicate to perform external authentication.

According to a fourth aspect, this application provides a mobility management network element. The mobility management network element has a function of implementing the method according to the first aspect. The function may be implemented by hardware, or may be implemented by hardware executing corresponding software. The hardware and software include one or more modules corresponding to the foregoing function.

In a possible design of the fourth aspect, a structure of the mobility management network element includes a processor and a transceiver. The processor is configured to support the mobility management network element to perform the method according to the first aspect, and the transceiver is configured to support communication between the mobility management network element and another device. The mobility management network element may further include a memory. The memory is configured to be coupled to the processor, and stores program instructions and data that are necessary for the mobility management network element.

According to a fifth aspect, this application provides a terminal. The terminal has a function of implementing the method according to the second aspect. The function may be implemented by hardware, or may be implemented by hardware executing corresponding software. The hardware and software include one or more modules corresponding to the foregoing function.

With reference to the fifth aspect, in a possible design, a structure of the terminal includes a processor and a transceiver. The processor is configured to support the terminal to perform the method according to the second aspect, and the transceiver is configured to support communication between the terminal and another device. The terminal may further include a memory. The memory is configured to be coupled to the processor, and stores program instructions and data that are necessary for the terminal.

According to a sixth aspect, this application provides a data management network element. The data management network element has a function of implementing the method according to the third aspect. The function may be implemented by hardware, or may be implemented by hardware executing corresponding software. The hardware and software include one or more modules corresponding to the foregoing function.

With reference to the sixth aspect, in a possible design, a structure of the data management network element includes a processor and a transceiver. The processor is configured to support the data management network element to perform the method according to the third aspect, and the transceiver is configured to support communication between the data management network element and another device. The data management network element may further include a memory. The memory is configured to be coupled to the processor, and stores program instructions and data that are necessary for the data management network element.

According to a seventh aspect, this application provides an apparatus (for example, the apparatus may be a chip system). The apparatus includes a processor, and may perform any one or more of the methods according to the first aspect to the third aspect.

With reference to the seventh aspect, in a possible design, the apparatus further includes a memory configured to store necessary program instructions and data.

According to an eighth aspect, this application provides a computer program product. When the computer program product runs on a computer, the computer is enabled to perform any one or more of the methods according to the first aspect to the third aspect.

According to a ninth aspect, this application provides a computer-readable storage medium. The computer-readable storage medium stores instructions; and when the instructions are run on a computer, the computer is enabled to perform any one or more of the methods according to the first aspect to the third aspect.

According to a tenth aspect, this application provides a communication system. The system includes the mobility management network element according to the first aspect and the terminal according to the second aspect, or includes the mobility management network element according to the first aspect and the data management network element according to the third aspect.

With reference to the tenth aspect, in a possible design, the system further includes another device, for example, a base station or an authentication server function network element, that interacts with the mobility management network element according to the first aspect, the terminal according to the second aspect, or the data management network element according to the third aspect.

DESCRIPTION OF EMBODIMENTS

To make objectives, technical solutions, and advantages of embodiments of this application clearer, the following describes the technical solutions in the embodiments of this application in detail with reference to the accompanying drawings of the specification and implementations.

In the description of this application, "a plurality of" means two or more. In view of this, in the embodiments of this application, "a plurality of" may also be understood as "at least two". The term "at least one" may be understood as one or more, for example, understood as one, two, or more. For example, "include at least one" means "include one, two, or more", and there is no limitation on which is included. For example, "include at least one of A, B, and C" may mean "include A, B, or C", "include A and B", "include A and C", "include B and C", or "include A, B, and C". The term "and/or" describes an association relationship between associated objects and represents that three relationships may exist. For example, A and/or B may represent the following three cases: Only A exists, both A and B exist, and only B exists. In addition, unless otherwise specified, the character "/" generally indicates an "or" relationship between associated objects. The terms "system" and "network" may be used interchangeably in the embodiments of this application.

Unless otherwise stated, ordinal numbers such as "first" and "second" in the embodiments of this application are used to distinguish between a plurality of objects, and are not intended to limit a sequence, a time sequence, priorities, or importance of the plurality of objects.

Figures 1, 2:
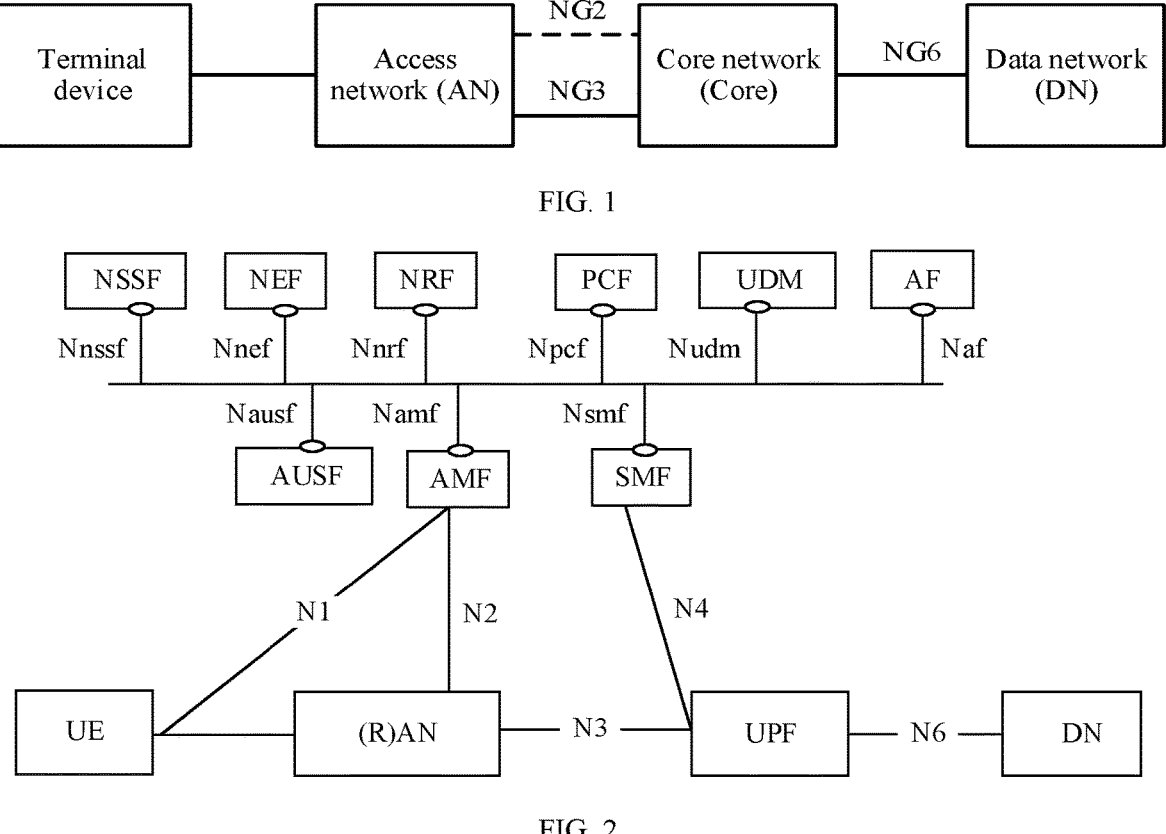
FIG. 1 is a schematic diagram of a network architecture according to an embodiment of this application.
FIG. 2 is a schematic diagram of a 5G network architecture according to an embodiment of this application.

FIG. 1 is a diagram of an example of a network architecture of a communication system to which this application is applicable. Network elements in the network architecture include a terminal, an access network (AN), a core network (Core), and a data network (DN). The access network may be a radio access network (RAN). In the network architecture, the terminal, the AN, and the core are main parts of the network architecture. Network elements in the AN and the core may be logically divided into two parts: a user plane and a control plane. The control plane is responsible for managing a mobile network, and the user plane is responsible for transmitting service data. For example, in the network architecture shown in FIG. 1, an NG2 reference point is located between a RAN control plane and a core control plane, an NG3 reference point is located between a RAN user plane and a core user plane, and an NG6 reference point is located between the core user plane and the DN.

In the network architecture shown in FIG. 1, the terminal is also referred to as a terminal device, a user equipment (UE), a mobile station (MS), a mobile terminal (MT), or the like. The terminal is a device with a wireless transceiver function, and is an entry for a mobile user to interact with a network. The terminal can provide a basic computing capability and a storage capability, display a service window to the user, and receive an input operation of the user. In a 5G communication system, the terminal establishes a signal connection and a data connection to the AN using a new radio technology, to transmit a control signal and service data to the network.

The terminal may be deployed on land, including an indoor device, an outdoor device, a handheld device, or a vehicle-mounted device; may be deployed on water (for example, on a ship); or may be deployed in the air (for example, on a plane, a balloon, or a satellite). For example, the terminal may include a mobile phone (or referred to as a "cellular" phone), a computer having a mobile terminal, a portable, pocket-sized, handheld, computer-built-in, or in-vehicle mobile apparatus, or an intelligent wearable device. For example, the terminal is a device such as a personal communications service (PCS) phone, a cordless telephone set, a Session Initiation Protocol (SIP) phone, a wireless local loop (WLL) station, or a personal digital assistant (PDA).

Alternatively, the terminal may further include a limited device, for example, a device with low power consumption, a device with a limited storage capability, or a device with a limited computing capability. For example, the terminal includes an information sensing device such as a bar code, radio frequency identification (RFID), a sensor, a Global Positioning System (GPS), or a laser scanner.

By way of example and not limitation, in the embodiments of this application, an intelligent wearable device is a general term of wearable devices such as glasses, gloves, watches, clothes, and shoes that are developed by applying wearable technologies to intelligent designs of daily wear. The intelligent wearable device is a portable device that is directly worn on the body or integrated into clothes or an accessory of a user. The intelligent wearable device is not only a hardware device, but also implements a powerful function through software support, data exchange, and cloud interaction. Generalized intelligent wearable devices include full-featured and large-sized devices that can implement complete or partial functions without depending on smartphones, for example, smart watches or smart glasses, and devices that focus on only one type of application function and need to work with other devices such as smartphones, for example, various smart bands, smart helmets, or smart jewelry for monitoring physical signs.

Alternatively, the terminal may be a virtual reality (VR) device, an augmented reality (AR) device, a wireless terminal in industrial control, a wireless terminal in self-driving, a wireless terminal in remote medical surgery, a wireless terminal in a smart grid, a wireless terminal in transportation safety, a wireless terminal in a smart city, a wireless terminal in a smart home, or the like.

In the network architecture shown in FIG. 1, the AN is similar to a (radio) access network ((R)AN) device in a conventional communication network, for example, includes a base station (for example, an access point), and is deployed at a location close to the terminal. The AN provides a network access function for an authorized user in a specific area, and can determine transmission tunnels of different quality based on a user level, a service requirement, or the like, to transmit user data. The AN can manage and properly use resources of the AN and provide an access service for the terminal as required, and is responsible for forwarding a control signal and service data between the terminal and the core.

In the network architecture shown in FIG. 1, the core is responsible for maintaining subscription data of a mobile network, managing a network element in the mobile network, and providing functions such as session management, mobility management, policy management, and security authentication for the terminal. For example, when the terminal is attached, the core provides network access authentication for the terminal; when the terminal has a service request, the core allocates a network resource to the terminal; when the terminal moves, the core updates a network resource for the terminal; when the terminal is idle, the core provides a fast resume mechanism for the terminal; when the terminal is detached, the core releases a network resource for the terminal; when the terminal has service data, the core provides a data routing function for the terminal, for example, forwards uplink data to the DN, or receives downlink data from the DN and forwards the downlink data to the AN.

In the network architecture shown in FIG. 1, the DN is a data network that provides a service for a user. In an actual communication process, a client is usually located on the terminal, and a server is usually located in the DN. The DN may be a private local area network, may be an external network that is not controlled by an operator, for example, the Internet, or may be a dedicated network jointly deployed by operators, for example, a network that provides an IP multimedia network subsystem (IMS) service.

FIG. 2 is a schematic diagram of an example network architecture to which this application is applicable. The network architecture is a 5G network architecture. Network elements in the 5G architecture include a terminal, a RAN, and a DN. For example, in FIG. 2, the terminal is UE. In addition, the network architecture further includes core network elements, and the core network elements include a UPF network element and a control plane function network element. For example, the control plane function network element includes but is not limited to an access and mobility management function (AMF) network element, an SMF network element, an authentication server function (AUSF) network element, an application function (AF) network element, a unified data management (UDM) network element, a policy control function (PCF) network element, a network exposure function (NEF) network element, an NF repository function (NRF) network element, and a network slice selection function (NSSF) network element.

It should be noted that, in a conventional core network architecture, point-to-point communication is performed between control plane function network elements. To be more specific, a set of specific messages are used for communication through an interface between the control plane function network elements, and the control plane function network elements at two ends of the interface can communicate with each other using only the set of specific messages. However, in a 5G core network architecture, a control plane uses a service-based architecture. To be more specific, interaction between control plane function network elements is performed in a service invoking manner, and a control plane function network element opens a service to another control plane function network element, such that the other control plane function network element can invoke the service.

The following describes in detail functions of the network elements in the network architecture shown in FIG. 2. Because functions of the UE, the (R)AN, and the DN have been described in related description of the network architecture shown in FIG. 1, the following mainly describes functions of the core network elements.

The UPF network element is a function network element on a user plane, and is mainly responsible for connecting to an external network. The UPF network element performs related functions of a serving gateway (SGW) and a packet data network gateway (PDN-GW) in Long-Term Evolution (LTE). For example, the UPF may forward a user data packet according to a routing rule of the SMF, for example, send uplink data to the DN or another UPF, or forward downlink data to another UPF or the RAN.

The AMF network element is responsible for access management and mobility management of the UE, for example, is responsible for maintaining a UE status, managing reachability of the UE, forwarding a mobility management non-access-stratum (MM NAS) message, and forwarding a session management (SM) N2 message. During actual application, the AMF network element may implement a mobility management function of an MME in an LTE network framework, and may further implement an access management function.

The SMF network element is responsible for session management, and allocates or releases resources for a session of the UE. The resources include session quality of service (QoS), a session path, a routing rule, and the like.

The AUSF network element is configured to perform security authentication on the UE.

The AF network element may be a third-party application control platform, or may be a device deployed by an operator. The AF network element may provide services for a plurality of application servers.

The UDM network element may store subscription information of the UE, or may store subscription information of the UE using a user data repository (UDR).

The PCF network element is configured to perform user policy management, and is similar to a policy and charging rules function (PCRF) network element in LTE. The PCF network element is mainly responsible for generation of a policy authorization rule, a quality of service rule, and a charging rule. The SMF generates the routing rule using the corresponding rules, and delivers the routing rule to the UPF network element, to implement installation of a corresponding policy and rule.

The NEF network element is configured to expose a network function to a third party through a northbound application programming interface (API).

The NRF network element is configured to provide functions of storing and selecting network function entity information for another network element.

The NSSF network element is configured to select a network slice for the UE.

The following describes an application scenario of this application. This application is mainly applied to an NPN scenario.

Figure 3:
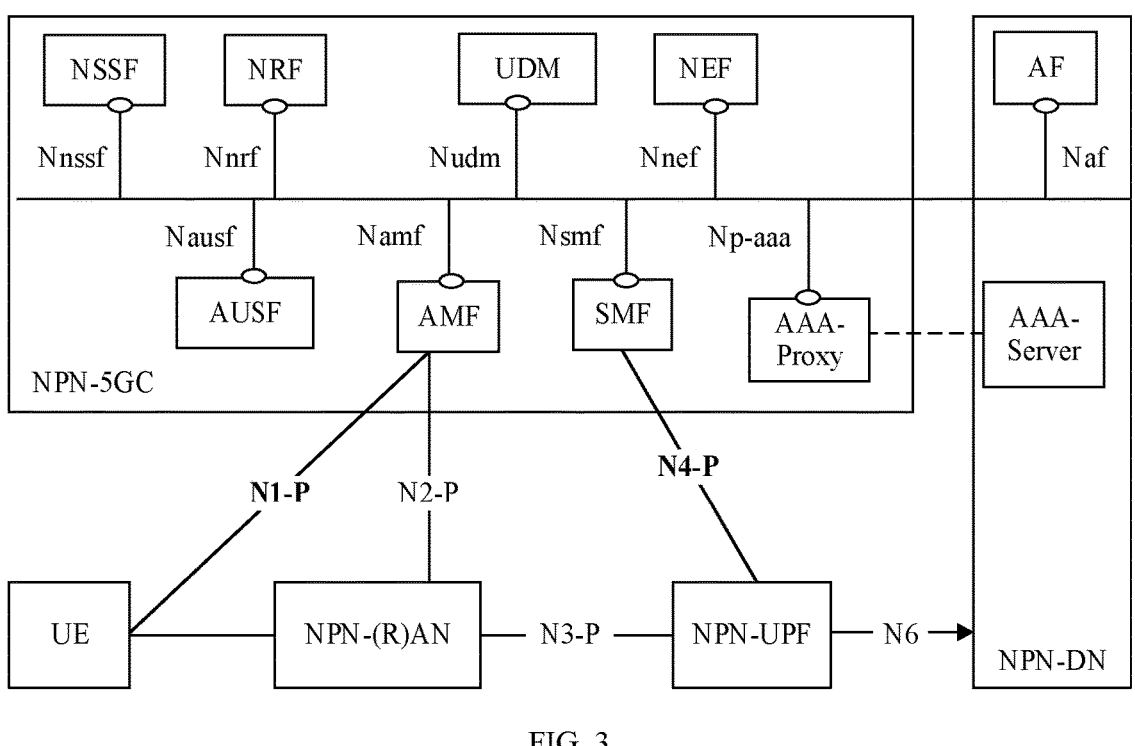
FIG. 3 is a schematic diagram of an NPN architecture according to an embodiment of this application.

FIG. 3 is a schematic diagram of an NPN architecture according to this application. For related description of UE, a (R)AN, a DN, and each core network element, refer to the network architecture shown in FIG. 2. An authentication authorization accounting proxy (AAA-Proxy or AAA-P) is a proxy entity required for performing authentication on a terminal with external subscription. The AAA-P may be deployed as an independent network element or may serve as a part of a NEF or an AUSF, and is responsible for interacting with an authentication authorization accounting server (AAA-Server or AAA-S).

It should be noted that a mobility management network element in this application may be an MME in an LTE network framework, an AMF in a 5G network framework, or a network element responsible for mobility management in a future network. An authentication server function network element in this application may be an AUSF in a 5G network structure or a network element responsible for an authentication service in a future network. The authentication server function network element in this application may be replaced with the AAA-P, in other words, the AAA-P implements actions of the authentication server function network element in this application. A data management network element in this application may be a home subscriber server (HSS) in the LTE network framework, a UDM in the 5G network framework, or a network element responsible for data management in the future network.

An NPN allows UE to access the network using external subscription. A difference between authentication of UE with internal subscription and authentication of UE with external subscription lies in: General 5G authentication is performed on the UE with the internal subscription, and external authentication is performed on the UE with the external subscription. The external subscription in this application means that user subscription of a terminal is owned by an entity independent of the NPN, in other words, an entity that stores user subscription of a terminal may not be within the NPN architecture. In the NPN, the external authentication in this application means performing authentication on the terminal in the NPN through a trusted third party (the third party and an external entity may be used interchangeably in the embodiments of this application), to determine that the terminal can access the NPN or that the terminal can use a service provided by the third party. The trusted third party (the external entity) is not within the NPN framework.

It should be noted that the NPN is a scenario to which a method provided in this application is applicable. The method provided in this application may also be applied to a remote terminal (remote UE), an industrial and enterprise device, an Internet of Things (IoT) device, and an enhanced mobile broadband (eMBB) device in a relay scenario. It should be understood that different scenarios should not constitute a limitation on this application.

Figure 4:
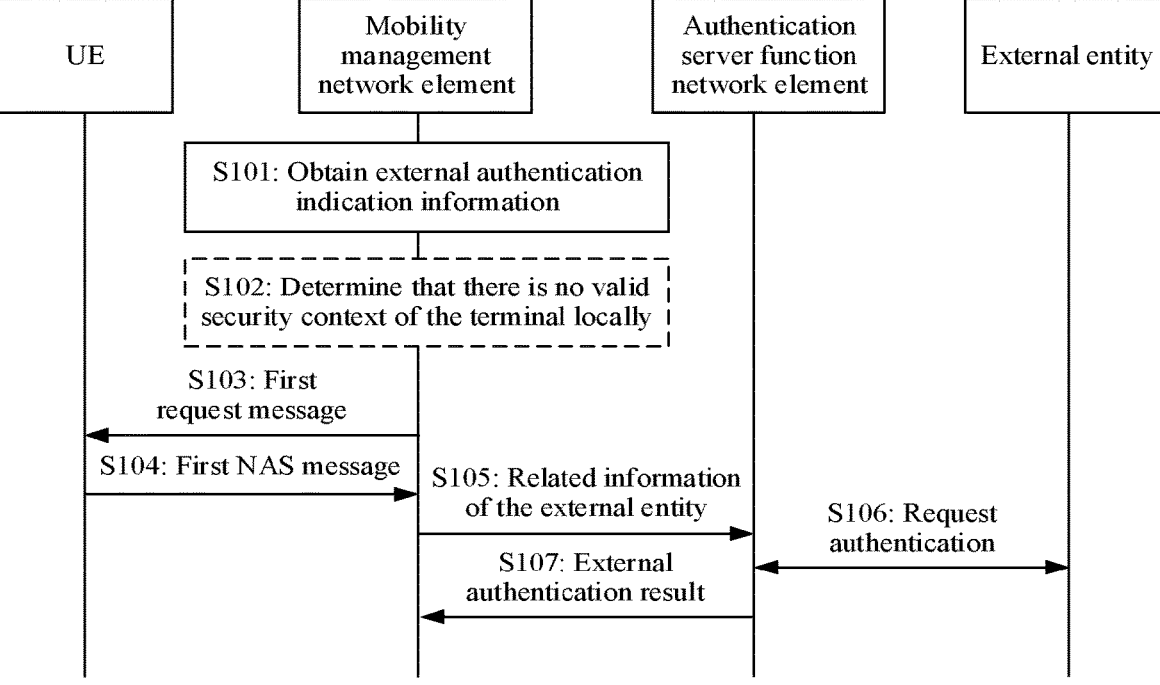
FIG. 4 is a flowchart of an external authentication method according to an embodiment of this application.

FIG. 4 is a flowchart of an external authentication method according to an embodiment of this application. The flowchart is described as follows.

S101: A mobility management network element obtains external authentication indication information.

The external authentication indication information is used to indicate to perform external authentication, and includes any one or more of the following: a registration type value that is set to external registration, an indication used to indicate that a terminal supports the external authentication, an information element (IE) used to indicate to perform external authentication, an external authentication security parameter, or an identity of a terminal that is set to a special value/domain.

The identity of the terminal is any identity that can uniquely indicate the terminal, for example, may be any one or more of the following: a subscription permanent identifier (SUPI), a subscription concealed identifier (SUCI), a mobile station international ISDN number (MSISDN), a generic public subscription identifier (GPSI), or an international mobile subscriber identity (IMSI).

The identity of the terminal that is set to the special value/domain may be in a default configuration of the UE or in a configuration of an external subscription account of the UE, or may be constructed by the UE based on information provided by a third party.

The mobility management network element obtains the external authentication indication information in the following manners.

1. Receive the External Authentication Indication Information from the Terminal.

For example, the mobility management network element receives a registration request message from the terminal, where the registration request message includes the external authentication indication information.

Alternatively, the mobility management network element receives a registration request message from the terminal. If integrity protection performed by the mobility management network element on the registration request message fails, the mobility management network element sends an identity request message to the terminal. The mobility management network element receives an identity response message from the terminal, where the identity response message includes the external authentication indication information.

2. Receive the External Authentication Indication Information from an Authentication Server Function Network Element.

For example, the mobility management network element sends a terminal authentication request message to the authentication server function network element. The mobility management network element receives a terminal authentication response message from the authentication server function network element, where the terminal authentication response message includes the external authentication indication information.

3. Receive the External Authentication Indication Information from a Data Management Network Element.

For example, the mobility management network element sends a subscription obtaining request message to the data management network element. The mobility management network element receives a subscription obtaining response message from the data management network element, where the subscription obtaining response message includes the external authentication indication information.

Optionally, the mobility management network element further receives a third-party identifier from the data management network element. The third-party identifier is used to identify an external entity, and includes any one or more of the following: a network access identifier (NAI), a data network name (DNN), a service provider identifier (SP-ID), or single network slice selection assistance information (S-NSSAI). The external entity may be, for example, an AAA-S, where the AAA-S may be located in a DN or may be located in a PLMN (an external entity in the following embodiments may be mutually replaced with an AAA-S). It should be noted that the external entity that performs authentication on the terminal does not necessarily store external subscription data of the terminal, in other words, the external entity that performs authentication on the terminal and an entity that stores the external subscription data of the terminal are not necessarily the same. The external entity that performs authentication on the terminal may perform authentication on the terminal through the entity that obtains the external subscription data of the terminal.

S102: Optionally, the mobility management network element determines that there is no valid security context of the terminal locally.

An AMF determines that there is no security context of the terminal locally, or determines that there is a security context locally but the security context has been invalid.

It should be noted that S102 and S101 are not strictly performed in a sequence. S102 may be performed before S101 or performed after S102. This is not limited in this application.

S103: The mobility management network element sends a first request message to the terminal based on the external authentication indication information, such that the terminal receives the first request message from the mobility management network element, where the first request message is used to request the external authentication.

Optionally, the first request message includes the third-party identifier.

S104: The terminal sends a first NAS message to the mobility management network element, such that the mobility management network element receives the first NAS message from the terminal.

Optionally, the first NAS message includes the third-party identifier and/or an external authentication request, and the external authentication request is used to request the external entity to perform authentication on the terminal.

S105: The mobility management network element sends related information of the external entity to the authentication server function network element based on the first NAS message, such that the authentication server function network element receives the related information of the external entity from the mobility management network element. The related information of the external entity is used to address the external entity that is to perform authentication on the terminal, and includes the third-party identifier or a communication address of the external entity.

The communication address of the external entity may be any address that can be used to address the external entity, for example, may be an Internet Protocol (IP) address of the external entity or a fully qualified domain name (FQDN).

If the mobility management network element sends the communication address of the external entity to the authentication server function network element, before S105, the mobility management network element determines the communication address of the external entity based on the third-party identifier. If the mobility management network element sends the third-party identifier to the authentication server function network element, after S105, the authentication server function network element determines the communication address of the external entity based on the third-party identifier, and selects a target external entity.

Optionally, the mobility management network element further sends the external authentication request to the authentication server function network element.

S106: The authentication server function network element requests the external entity to perform authentication on the terminal, and obtains an external authentication result.

In an example, the authentication server function network element sends the external authentication request to the external entity, and receives the external authentication result from the external entity.

The external authentication result may be that the external authentication succeeds or fails.

In an example, if the external authentication result is that the external authentication succeeds, the external entity further sends an anchor key to the authentication server function network element, where the anchor key is used to set up a security context.

S107: The authentication server function network element sends the external authentication result to the mobility management network element, such that the mobility management network element receives the external authentication result from the authentication server function network element.

In an example, if the external authentication result is that the external authentication succeeds, the authentication server function network element further sends the anchor key to the mobility management network element. Optionally, the mobility management network element configures, for the terminal that is authenticated, third-party service information corresponding to the external entity, where the third-party service information is, for example, a network slice and/or a DNN.

Based on the method provided in FIG. 4, the mobility management network element obtains the external authentication indication information, enables the external authentication, and obtains the external authentication result from a trusted third party, to implement, based on the authentication result from the third party, the authentication of the terminal with external subscription.

With reference to FIG. 5 to FIG. 7A and FIG. 7B in embodiments, the following describes in detail the method provided in FIG. 4. For example, the mobility management network element is an AMF, the authentication server function network element is an AUSF, and the data management network element is a UDM.

Figure 5:
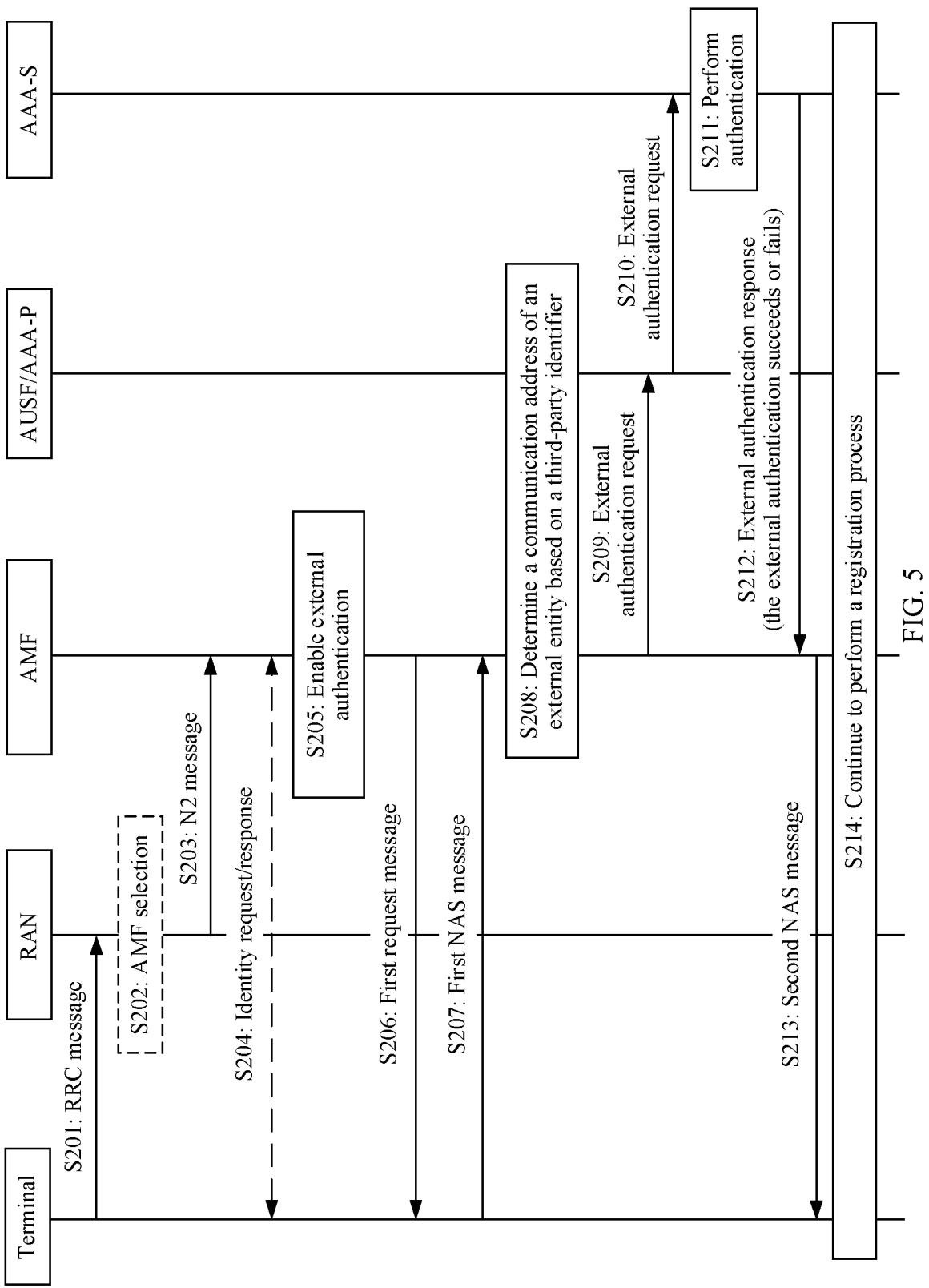
FIG. 5 is a flowchart of another external authentication method according to an embodiment of this application.

Based on the embodiment shown in FIG. 4, FIG. 5 shows an external authentication method according to an embodiment of this application. In the method, the terminal has external subscription but has no internal subscription. In a registration process, the terminal explicitly or implicitly indicates the AMF to perform external authentication. The AMF triggers the external authentication, obtains an external authentication result, and sets up a security context of the terminal. A procedure for the method is described as follows.

S201: The terminal sends a radio resource control (RRC) message to a RAN, such that the RAN receives the RRC message from the terminal.

The RRC message includes a registration request and external authentication indication information; or the RRC message includes a registration request, and the registration request includes external authentication indication information.

For description of the external authentication indication information, refer to S101. Details are not described herein again.

For description of an identity of the terminal, refer to S101. Details are not described herein again.

The identity of the terminal that is set to a special value/domain may be in a default configuration of the UE or in a configuration of an external subscription account of the UE, or may be constructed by the UE based on information provided by a third party.

S202: Optionally, the RAN obtains the external authentication indication information from the RRC message, and selects the AMF that supports the external authentication.

S203: The RAN sends N2 information to the AMF, such that the AMF receives the N2 information from the RAN.

If S202 is performed, the RAN sends the N2 information to the selected AMF.

The N2 information includes the registration request and the external authentication indication information; or the N2 information includes the registration request, and the registration request includes the external authentication indication information.

S204: If integrity protection authentication performed by the AMF on the registration message fails, the AMF obtains the external authentication indication information using an identity request message and an identity response message.

If the external authentication indication information is the identity of the terminal that is set to the special value/domain, the AMF obtains, using the identity request message and the identity response message, the identity of the terminal that is set to the special value/domain. If the external authentication indication information is not the identity of the terminal that is set to the special value/domain, the AMF may obtain the identity of the terminal and the external authentication indication information using the identity request message and the identity response message.

S205: The AMF determines that there is no valid security context of the terminal locally, and enables the external authentication based on the external authentication indication information.

The AMF determines that there is no security context of the terminal locally, or determines that there is a security context locally but the security context has been invalid.

S206: The AMF sends a first request message to the terminal, such that the terminal receives the first request message from the AMF, where the first request message is used to request the external authentication.

S207: The terminal performs external authentication. For example, the terminal sends a first NAS message to the AMF, such that the AMF receives the first NAS message from the terminal.

The first NAS message includes a third-party identifier, and further includes an external authentication request.

For description of the third-party identifier, refer to S101. Details are not described herein again.

The external authentication request is used to request the external entity to perform authentication on the terminal.

S208: The AMF/AUSF/AAA-P determines a communication address of the external entity based on the third-party identifier.

If the AUSF/AAA-P determines the communication address of the external entity based on the third-party identifier, before S207, the AMF sends the third-party identifier to the AUSF/AAA-P. If the AMF determines the communication address of the external entity based on the third-party identifier, after S207, the AMF sends the communication address of the external entity to the AUSF/AAA-P.

For description of the communication address of the external entity, refer to S105. Details are not described herein again.

S209: The AMF sends the external authentication request to the AUSF, such that the AUSF receives the external authentication request from the AMF.

S210: The AUSF selects the target external entity based on the communication address of the external entity, and sends the external authentication request, such that the external entity receives the external authentication request from the AUSF.

Optionally, if the target external entity (the AAA-S) is located in the DN, the AUSF may send the external authentication request to the AAA-P. The AAA-P selects the target external entity based on the communication address of the external entity, and sends the external authentication request, such that the external entity receives the external authentication request from the AAA-P.

S211: The external entity performs authentication based on external subscription data of the terminal.

The external entity may locally store the subscription data of the terminal, or obtain the subscription data of the terminal stored by another entity, to perform authentication on the terminal.

S212: The external entity returns the external authentication result to the AUSF, and the AUSF returns the external authentication result to the AMF.

The external authentication result may be that the external authentication succeeds or fails. If the external authentication result is that the external authentication succeeds, the external entity may further return the external authentication result and an anchor key to the AUSF using a same message, and the AUSF further returns the external authentication result and the anchor key to the AMF, where the anchor key is used to set up the security context.

Optionally, if the target external entity (the AAA-S) is located in the DN, the external entity returns the external authentication result to the AAA-P, the AAA-P returns the external authentication result to the AUSF, and the AUSF returns the external authentication result to the AMF.

Optionally, the mobility management network element configures, for the terminal that is authenticated, third-party service information corresponding to the external entity, where the third-party service information is, for example, a network slice and/or a DNN.

S213: The terminal receives a second NAS message from the AMF, where the second NAS message includes the external authentication result.

S214: Continue to perform the registration process to complete registration.

Based on the method provided in FIG. 5, the AMF receives the external authentication indication information from the terminal, enables the external authentication, obtains the external authentication result from a trusted third party, and accepts or rejects the registration of the terminal based on the authentication result from the third party, to implement the authentication of the terminal with the external subscription.

Based on the embodiments shown in FIG. 4 and FIG. 5, FIG. 6A and FIG. 6B show an external authentication method according to this application. In the method, the terminal has both internal subscription and external subscription. In steps of triggering authentication and selecting an authentication mode, the UDM selects external authentication, and feeds back the external authentication to the AUSF and the AMF. The AMF enables the external authentication based on external authentication indication information. A flowchart of the method is described as follows:

S301: The terminal sends a registration request message to the RAN, such that the RAN receives the registration request message from the terminal.

S302: The RAN sends the registration request message to the AMF, such that the AMF receives the registration request message from the RAN.

S303: Optionally, the AMF obtains an identity of the terminal using an identity request message and an identity response message, where the identity of the terminal is, for example, a SUPI or a SUCI.

S304: The AMF determines that there is no valid security context of the terminal locally, and sends a terminal authentication request message to the AUSF, such that the AUSF receives the terminal authentication request message from the AMF.

The terminal authentication request message includes the identity of the terminal, and the identity of the terminal is, for example, the SUPI or the SUCI. Optionally, the terminal authentication request message further includes a serving network name (SN name).

S305: The AUSF sends an obtaining request message to the UDM, such that the UDM receives the obtaining request message from the AUSF.

The obtaining request message includes the identity of the terminal, and the identity of the terminal is, for example, the SUPI or the SUCI. Optionally, the obtaining request message further includes the SN name.

S306: The UDM determines, based on subscription data of the terminal, that the external authentication needs to be performed on the terminal.

In an example, the UDM determines, based on an external service authentication indication in the subscription data of the terminal, that the external authentication needs to be performed on the terminal. The external service authentication indication is used to indicate that the authentication mode of the terminal is the external authentication. The UDM selects the external authentication mode based on the external service authentication indication in a process of triggering the authentication and selecting the authentication mode.

Optionally, the terminal may initially have the internal subscription only, and access, using the internal subscription, a network in which the AMF is located. Then, the terminal obtains the external subscription from a third party. In a process of obtaining the external subscription, an external service authentication indication in the internal subscription is inactive for the terminal. After the external subscription is obtained, the UDM updates a status of the external service authentication indication in the internal subscription to active. The UDM may, for example, update the status of the external service authentication indication in the internal subscription in the following manners: 1. After performing 5G authentication for the first time, the UDM actively updates the status of the external service authentication indication. 2. The terminal obtains the external subscription and triggers deregistration, where a reason for indicating the AMF to perform deregistration is "subscription is complete"; the AMF notifies the UDM to update the status of the external service authentication indication. 3. The third party updates the status of the external service authentication indication in the internal subscription in the network through a NEF. 4. The third party triggers, through a network element, for example, the AAA-P/AUSF/AMF, the UDM to update the status of the external service authentication indication in the internal subscription.

S307: The UDM sends an obtaining response message to the AUSF, such that the AUSF obtains the obtaining response message from the UDM.

The obtaining response message includes the external authentication indication information. For description of the external authentication indication information, refer to S101. Details are not described herein again.

S308: The AUSF sends a terminal authentication response message to the AMF, such that the AMF receives the terminal authentication response message from the AUSF.

The terminal authentication response message includes the external authentication indication information, and the external authentication indication information is, for example, an IE used to indicate to perform external authentication.

For S309 to S318, refer to S205 to S214. Details are not described in this application.

Figure 6A:
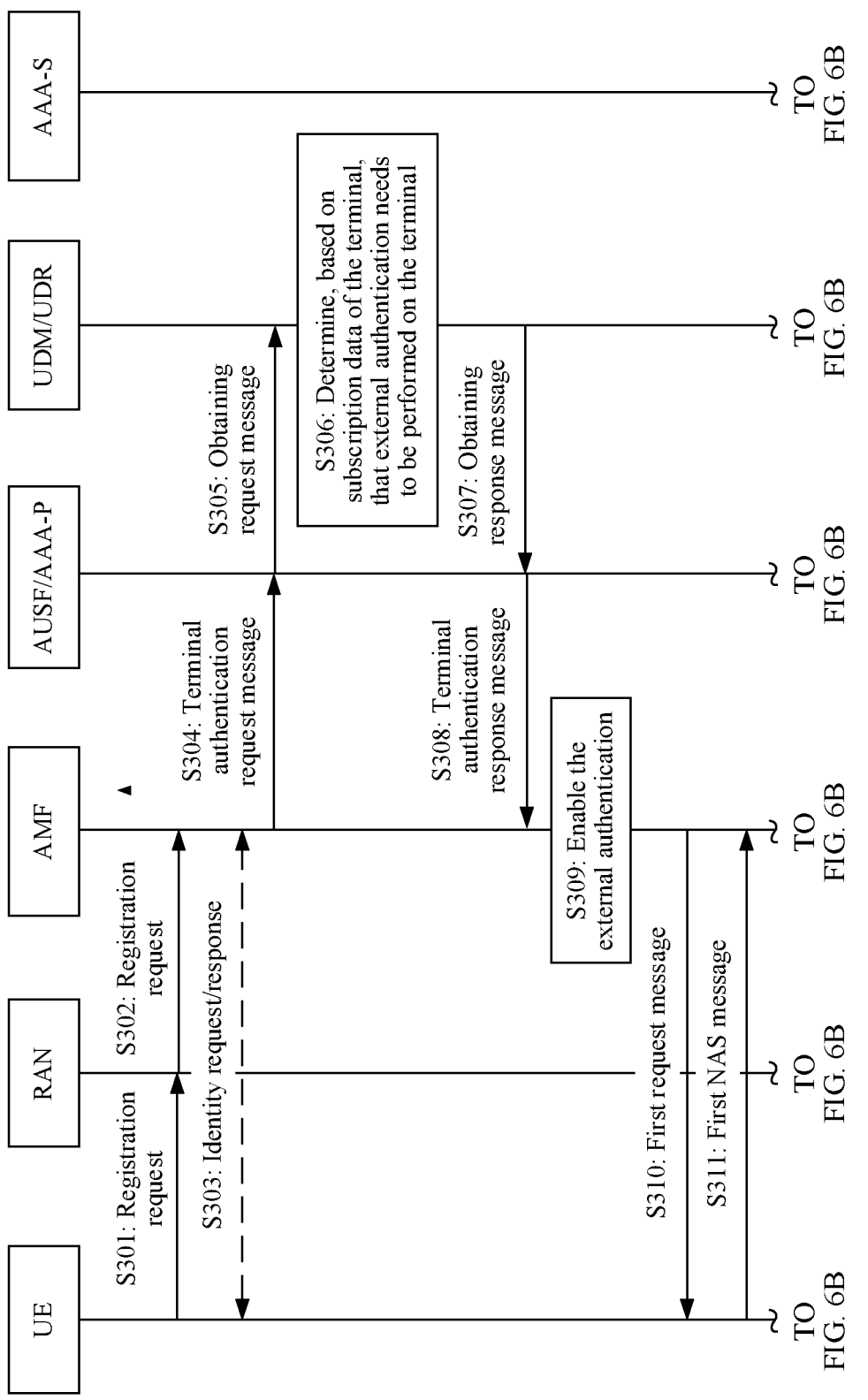
FIG. 6A and FIG. 6B are a flowchart of another external authentication method according to an embodiment of this application.
Figure 6B:
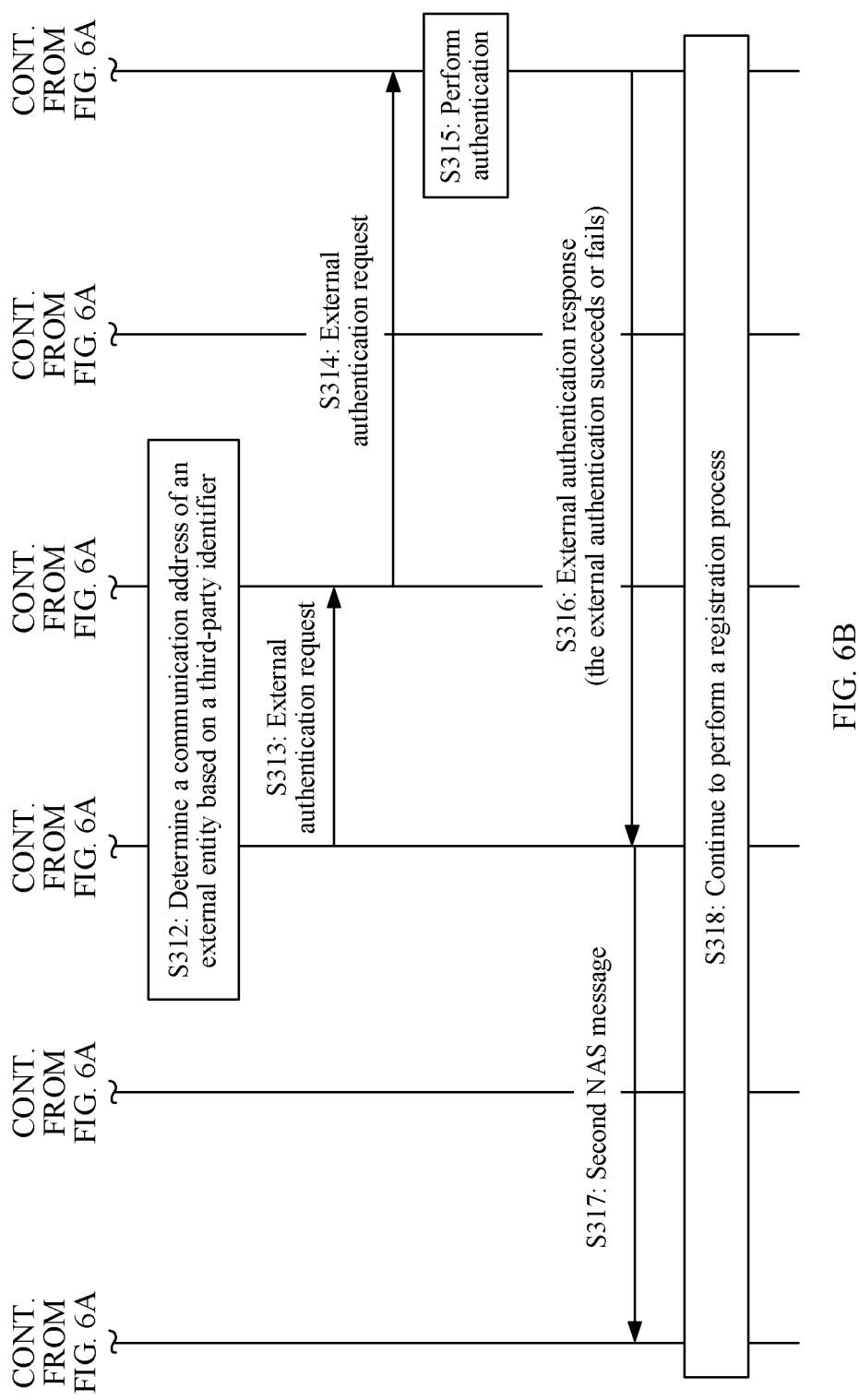

Based on the method provided in FIG. 6A and FIG. 6B, the AMF receives the external authentication indication information from the AUSF, enables the external authentication, obtains an external authentication result from a trusted third party, and accepts or rejects registration of the terminal based on the authentication result from the third party, to implement the authentication of the terminal with the external subscription.

Figure 7A:
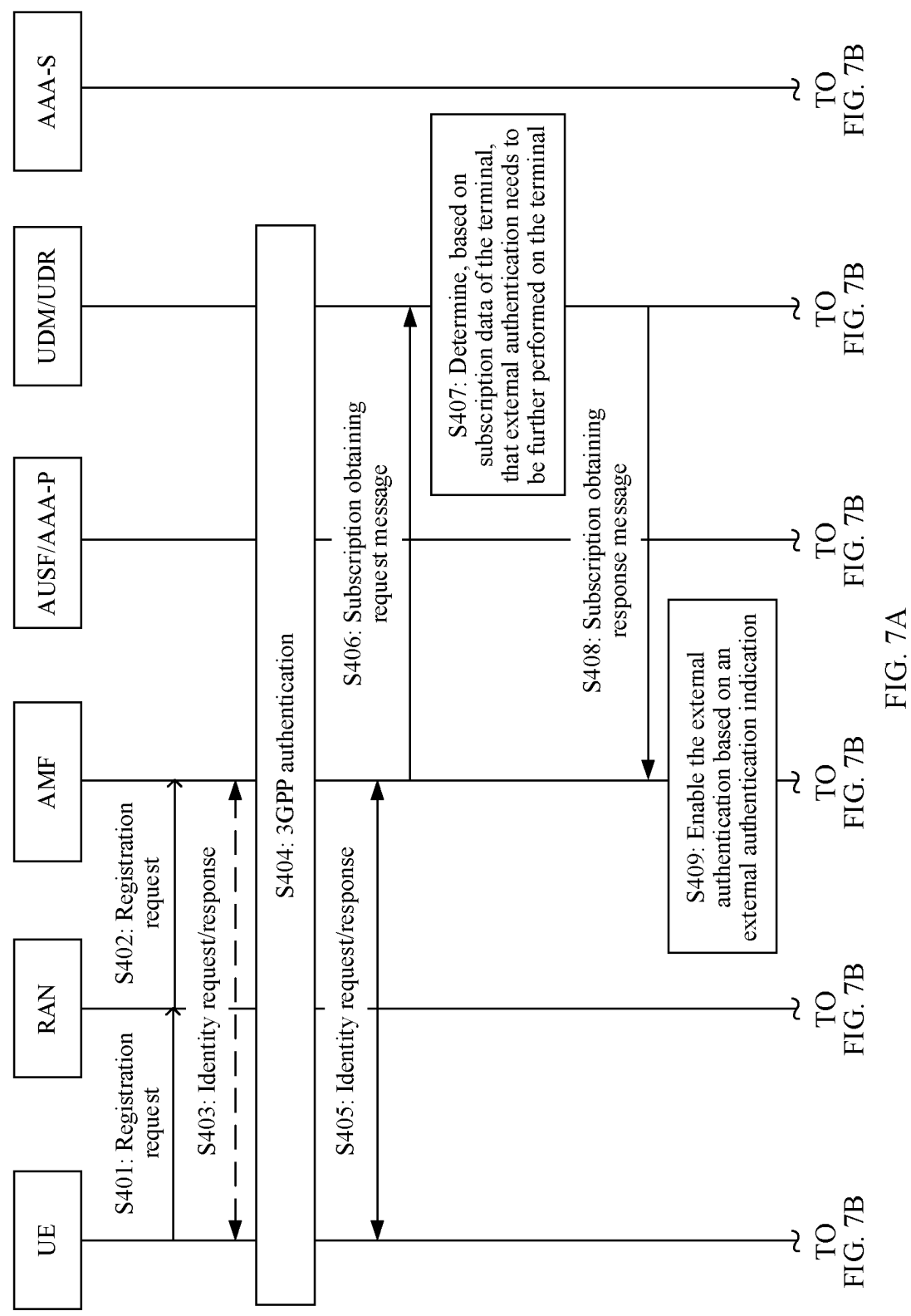
FIG. 7A and FIG. 7B are a flowchart of another external authentication method according to an embodiment of this application.
Figure 7B:
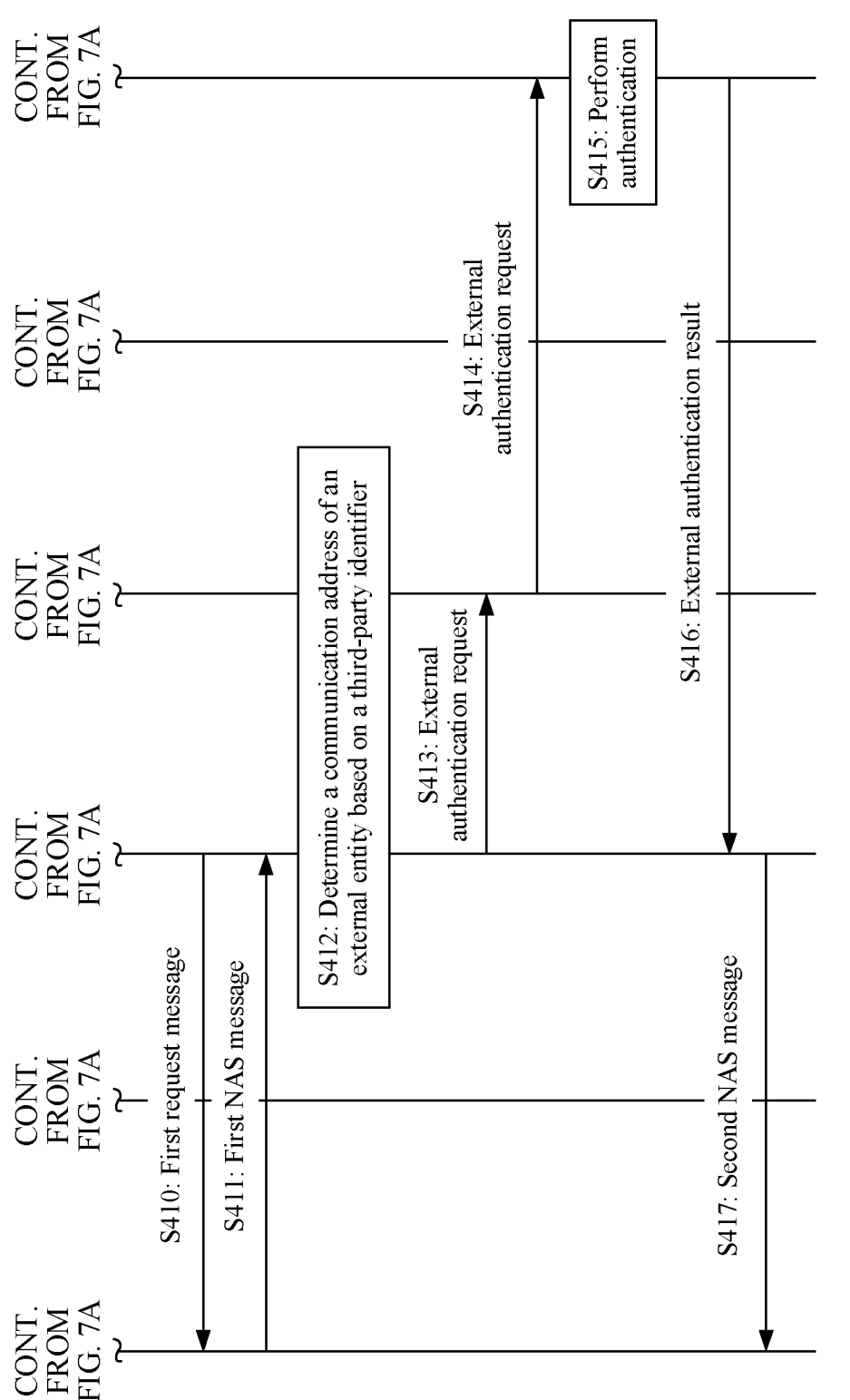

Based on the embodiment shown in FIG. 4, FIG. 7A and FIG. 7B show an external authentication method according to this application. In the method, a network side first sets up a security context for a user through 5G authentication using internal subscription. Then, the UDM indicates to the AMF based on subscription data that external authentication needs to be further performed on the terminal. The external entity performs authentication on the terminal, and sends an authentication result to the AMF. A flowchart of the method is described as follows:

For S401 to S403, refer to S301 to S303. Details are not described in this application.

S404: The terminal performs 3GPP security authentication.

In this step, the AMF obtains an anchor key, and sets up a security context of the terminal.

S405: The AMF obtains a permanent equipment identifier (PEI) of the terminal using the identity request message and the identity response message.

S406: The AMF sends a subscription obtaining request message to the UDM, such that the UDM receives the subscription obtaining request message from the AMF.

The subscription obtaining request message includes the identity of the terminal, for example, the SUPI, and optionally further includes the PEI of the terminal.

S407: The UDM determines, based on the subscription data, that the external authentication needs to be further performed on the terminal.

Optionally, the terminal may initially have the internal subscription only, and access, using the internal subscription, a network in which the AMF is located. Then, the terminal obtains external subscription from a third party. After the external subscription is obtained, an external service authentication indication in the internal subscription may be inactive for the terminal. After the external subscription is obtained, the UDM updates a status of the external service authentication indication in the internal subscription to active. The UDM may update the status of the external service authentication indication in the internal subscription in a plurality of manners. For description of the plurality of manners, refer to S306. Details are not described herein again.

It should be noted that the internal subscription may alternatively be internal subscription shared by a plurality of terminals, instead of private internal subscription of a specific terminal. If the internal subscription is shared by the plurality of terminals, the AMF sends the PEI to the UDM in a service procedure for updating the internal subscription, such that the UDM activates an external service authentication indication related to the PEI. That is, in S406, the AMF sends the PEI to the UDM, and the UDM obtains the external service authentication indication of the device in the shared internal subscription based on the PEI.

S408: The UDM sends a subscription obtaining response message to the AMF, such that the AMF obtains the subscription obtaining response message from the UDM.

The subscription obtaining response message includes external authentication indication information, and optionally further includes one or more third-party identifiers (a plurality of third-party identifiers may be, for example, a third-party identifier 1 and a third-party identifier 2). The third-party identifier is used to identify the external entity that is to perform authentication on the terminal. For description of the external authentication indication information, refer to S101. For description of the third-party identifier, refer to S106. Details are not described herein again.

It should be noted that, local service subscription of the UDM may include the one or more third-party identifiers. The UDM feeds back the one or more third-party identifiers to the AMF, such that the AMF indicates one or more external entities indicated by the one or more third-party identifiers, to perform external authentication. For example, the third-party identifier 1 indicates an external entity 1, the third-party identifier 2 indicates an external entity 2, and the UDM feeds back the third-party identifier 1 and the third-party identifier 2 to the AMF, such that the AMF indicates the external entity 1 and the external entity 2 to perform external authentication. If the UDM feeds back no third-party identifier to the AMF, the terminal actively selects a third-party identifier for authentication. For a step in which the terminal actively selects the third-party identifier for authentication, refer to S107 to S113.

S409: The AMF enables the external authentication based on the external authentication indication information.

S410: The AMF sends a first request message to the terminal, such that the terminal receives the first request message from the AMF, where the first request message is used to request the external authentication.

Optionally, the first request message includes the one or more third-party identifiers. For example, if the first request message includes the third-party identifier 1 and the third-party identifier 2, the terminal learns that a network (for example, an NPN) in which the AMF is located allows the terminal to use a third-party service corresponding to the external entity 1 and a third-party service corresponding to the external entity 2.

S411: The terminal performs external authentication. For example, the terminal sends a first NAS message to the AMF, such that the AMF receives the first NAS message from the terminal.

The first NAS message may further include an external authentication request.

If the first request message includes the plurality of third-party identifiers, for example, the third-party identifier 1 and the third-party identifier 2, and the terminal determines, based on a local configuration of the external subscription, that a related credential in the local configuration corresponds to the external entity 1 but does not correspond to the external entity 2, the terminal triggers external authentication to be performed by the external entity 1. The related credential is, for example, one or more of a user certificate, a user name password, or an SP-ID. The terminal determines, based on the user certificate, the user password, the SP-ID, or any combination of the user certificate, the user password, and the SP-ID, that the related credential corresponds to the external entity 1. In this scenario, the first NAS message includes only the third-party identifier 1, and S107 to S114 are subsequently performed.

If the first request message includes one third-party identifier, and the terminal determines that a local related credential corresponds to the external entity 1, the terminal triggers external authentication to be performed by the external entity 1, and the first NAS message may include the third-party identifier.

If a third-party identifier included in the first NAS message does not belong to the one or more third-party identifiers included in the first request message, that is, an entity that is to perform authentication on the terminal is not specified by the AMF, the AMF may reject the first NAS message of the terminal.

For S412 to S415, refer to S208 to S211. Details are not described in this application.

S416: The external entity returns the external authentication result to the AUSF, and the AUSF returns the external authentication result to the AMF.

The external authentication result may be that the external authentication succeeds or fails.

If the external authentication result is that the external authentication succeeds, the AMF determines, based on the external authentication result, that the terminal is trusted to a specific third party and is allowed to use a corresponding third-party service.

Optionally, the mobility management network element configures, for the terminal that is authenticated, third-party service information corresponding to the external entity, where the third-party service information is, for example, a network slice and/or a DNN.

S417: The AMF sends a second NAS message to the terminal, such that the terminal receives the second NAS message from the AMF, where the second NAS message includes the external authentication result.

If the external authentication result is that the external authentication succeeds, the terminal determines, based on the external authentication result, that the third-party service can be used Based on the method provided in FIG. 7A and FIG. 7B, the AMF receives the external authentication indication information from the UDM, enables the external authentication, obtains the external authentication result from the trusted third party, and allows, based on the authentication result from the third party, the terminal to use the corresponding third-party service.

The foregoing mainly describes, from a perspective of interaction between network elements, the solutions provided in the embodiments of this application. It may be understood that, to implement the foregoing functions, the mobility management network element, the terminal, the data management network element, the authentication server function network element, or the external entity includes a corresponding hardware structure and/or software module for executing each function. A person skilled in the art should be easily aware that, with reference to units and algorithm steps in the examples described in the embodiments disclosed in this specification, this application can be implemented in a form of hardware or a combination of hardware and computer software. Whether a function is performed by hardware or hardware driven by computer software depends on a particular application and a design constraint of the technical solutions. A person skilled in the art may use different methods to implement the described functions for each particular application, but it should not be considered that the implementation goes beyond the scope of this application.

In the embodiments of this application, the mobility management network element, the terminal, the data management network element, the authentication server function network element, or the external entity may be divided into functional modules based on the foregoing method examples. For example, each functional module may be obtained through division based on a corresponding function, or two or more functions may be integrated into one processing module. The integrated module may be implemented in a form of hardware, or may be implemented in a form of a software functional module. It should be noted that in the embodiments of this application, division into the modules is an example and is merely logical function division, and may be other division in an actual implementation.

Figure 8:
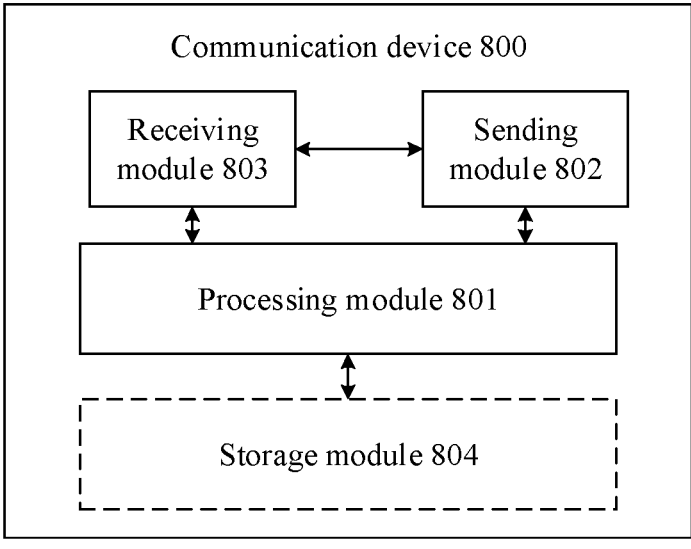
FIG. 8 is a schematic diagram of a structure of a communication device according to an embodiment of this application.

For example, the foregoing network elements or functions may be implemented through a communication device 800 in FIG. 8. As shown in FIG. 8, the communication device 800 may be the mobility management network element, the terminal, the data management network element, the authentication server function network element, the external entity, or the like. The communication device includes a processing module 801, a sending module 802, and a receiving module 803, and optionally further includes a storage module 804. The sending module 802 and the receiving module 803 may be a same module, for example, a communication module.

The processing module 801 is configured to control actions of the foregoing device, for example, support the foregoing device to perform the methods and the steps provided in the embodiments of this application. The sending module 802 is configured to support the foregoing device to send information to another network entity, for example, perform a step in which the foregoing device sends information to another network entity in the embodiments of this application. The receiving module 803 is configured to support the foregoing device to receive information sent by another network entity, for example, perform a step in which the foregoing device receives information sent by another network entity in the embodiments of this application. The storage module 804 is configured to store data and code of the foregoing device.

Figure 9:
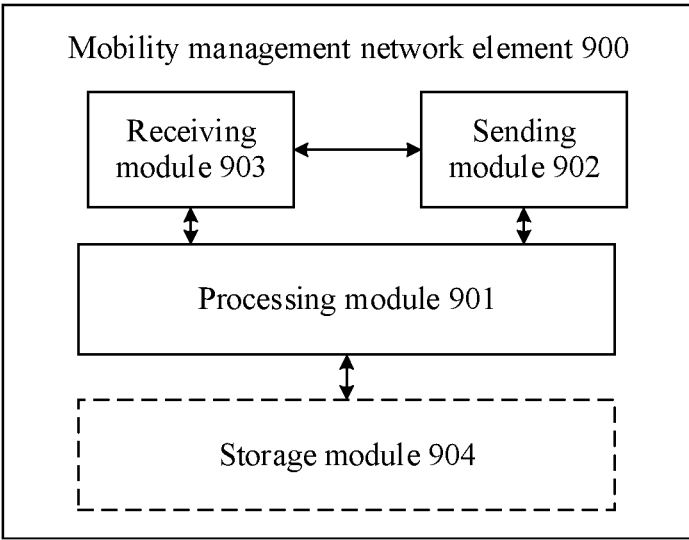
FIG. 9 is a schematic diagram of a structure of a mobility management network element according to an embodiment of this application.

The communication apparatus 800 may be the mobility management network element. FIG. 9 is a schematic diagram of a structure of a mobility management network element 900. The mobility management network element includes a processing module 901, a sending module 902, and a receiving module 903, and optionally further includes a storage module 904.

In an embodiment, the mobility management network element 900 may be configured to perform operations of the mobility management network element in the foregoing method embodiments. Details are as follows.

The processing module 901 is configured to: obtain external authentication indication information, where the external authentication indication information is used to indicate to perform external authentication, and for details, refer to S101 in FIG. 4; and send a first request message to a terminal through the sending module based on the external authentication indication information, where the first request message is used to request the external authentication, and for details, refer to S103 in FIG. 4.

The receiving module 903 is configured to receive a first NAS message from the terminal. For details, refer to S104 in FIG. 4.

The processing module 901 is further configured to send related information of an external entity to an authentication server function network element through the sending module 902 based on the first NAS message, where the related information of the external entity is used to address the external entity, and the external entity is configured to perform authentication on the terminal. For details, refer to S105 in FIG. 4.

The receiving module 903 is further configured to receive an external authentication result from the authentication server function network element. For details, refer to S107 in FIG. 4.

Further, the mobility management network element 900 may be further configured to perform corresponding steps in FIG. 5, FIG. 6A and FIG. 6B, or FIG. 7A and FIG. 7B. For details, refer to the description in the foregoing method embodiments.

Figure 10:
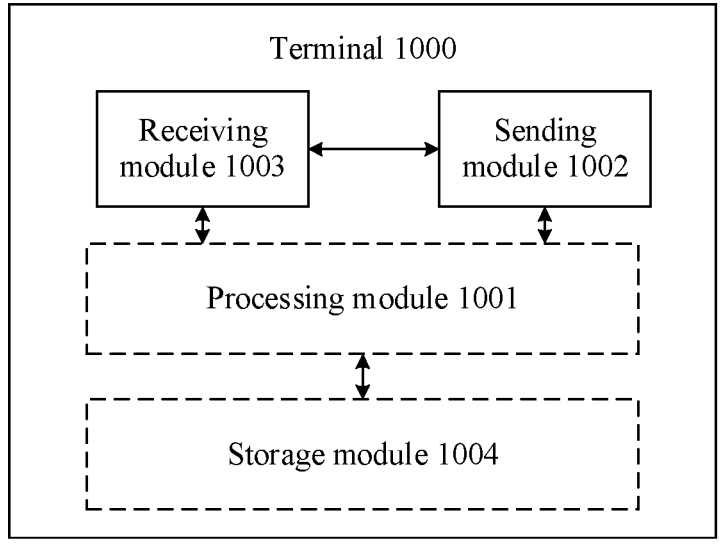
FIG. 10 is a schematic diagram of a structure of a terminal according to an embodiment of this application.

The communication apparatus 800 may be the terminal. FIG. 10 is a schematic diagram of a structure of a terminal 1000. The terminal includes a sending module 1002 and a receiving module 1003, and optionally further includes a processing module 1001 or a storage module 1004.

In an embodiment, the terminal 1000 may be configured to perform operations of the terminal in the foregoing method embodiments. Details are as follows:

The sending module 1002 is configured to send a registration request to a mobility management network element, where the registration request includes external authentication indication information, and the external authentication indication information is used to indicate to perform external authentication. For details, refer to S101 in FIG. 4.

The receiving module 1003 is configured to receive a first request message from the mobility management network element, where the first request message is used to request the external authentication. For details, refer to S103 in FIG. 4.

The sending module 1002 is further configured to send a first NAS message to the mobility management network element. For details, refer to S104 in FIG. 4.

The receiving module 1003 is further configured to receive a second NAS message for the first NAS message from the mobility management network element, where the second NAS message includes an external authentication result. For details, refer to S214 in FIG. 5.

Further, the terminal 1000 may be further configured to perform corresponding steps in FIG. 5, FIG. 6A and FIG. 6B, or FIG. 7A and FIG. 7B. For details, refer to the description in the foregoing method embodiments.

Figure 11:
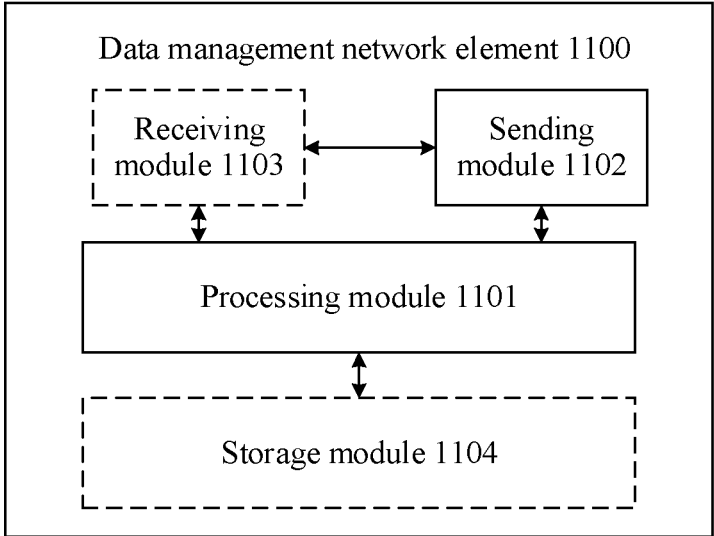
FIG. 11 is a schematic diagram of a structure of a data management network element according to an embodiment of this application.

The communication apparatus 800 may be the data management network element. FIG. 11 is a schematic diagram of a structure of a data management network element 1100. The data management network element includes a processing module 1101 and a sending module 1102, and optionally further includes a receiving module 1103 or a storage module 1104.

In an embodiment, the data management network element 1100 may be configured to perform operations of the data management network element in the foregoing method embodiments. Details are as follows:

The processing module 1101 is configured to: obtain an identity of a terminal, where for details, refer to S305 in FIG. 6A or S406 in FIG. 7A; and determine, based on subscription data of the terminal, that external authentication needs to be performed on the terminal, where for details, refer to S306 in FIG. 6A or S407 in FIG. 7A.

The sending module 1102 is configured to send external authentication indication information to a mobility management network element, where the external authentication indication information is used to indicate to perform external authentication on the terminal. For details, refer to S307 and S308 in FIG. 6A, or S408 in FIG. 7A.

Further, the data management network element 1100 may be further configured to perform corresponding steps in FIG. 4, FIG. 5, FIG. 6A and FIG. 6B, or FIG. 7A and FIG. 7B. For details, refer to the description in the foregoing method embodiments.

Figure 12:
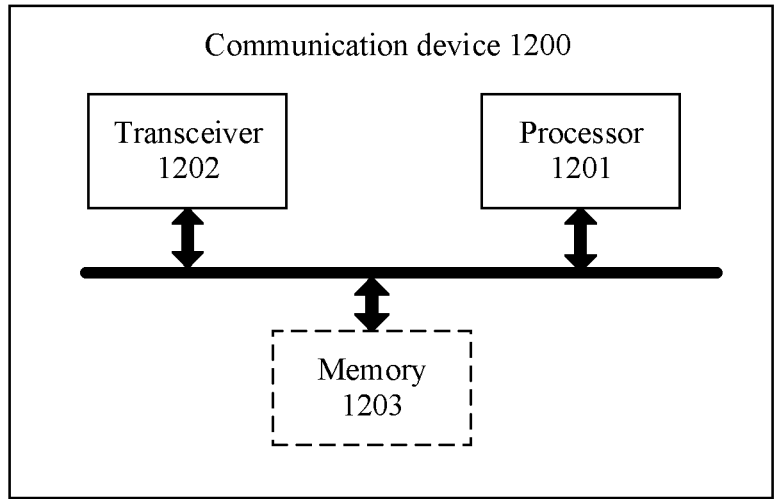
FIG. 12 is a schematic diagram of a structure of another communication device according to an embodiment of this application.

When the processing module 801, 901, 1001, or 1101 is a processor, the sending module 802, 902, 1002, or 1102 and the receiving module 803, 903, 1003, or 1103 are a transceiver, and the storage module 804, 904, 1004, or 1104 is a memory, the mobility management network element, the terminal, and the data management network element in the embodiments of this application may be in a structure shown in FIG. 12.

A communication device 1200 shown in FIG. 12 includes a processor 1201 and a transceiver 1202, and optionally may include a memory 1203 and a bus 1204. The processor 1201, the transceiver 1202, and the memory 1203 are connected through the bus 1204. For example, the processor 1201 may be a central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processor 1201 may implement or execute various example logical blocks, modules, and circuits described with reference to this application. Alternatively, the processor may be a combination of processors implementing a computing function, for example, a combination of one or more microprocessors, or a combination of the DSP and a microprocessor. The bus 1204 may be a Peripheral Component Interconnect (PCI) bus, an Extended Industry Standard Architecture (EISA) bus, or the like. Buses may be classified into an address bus, a data bus, a control bus, and the like. For ease of representation, only one thick line is used to represent the bus in FIG. 12, but this does not mean that there is only one bus or only one type of bus.

Figure 13:
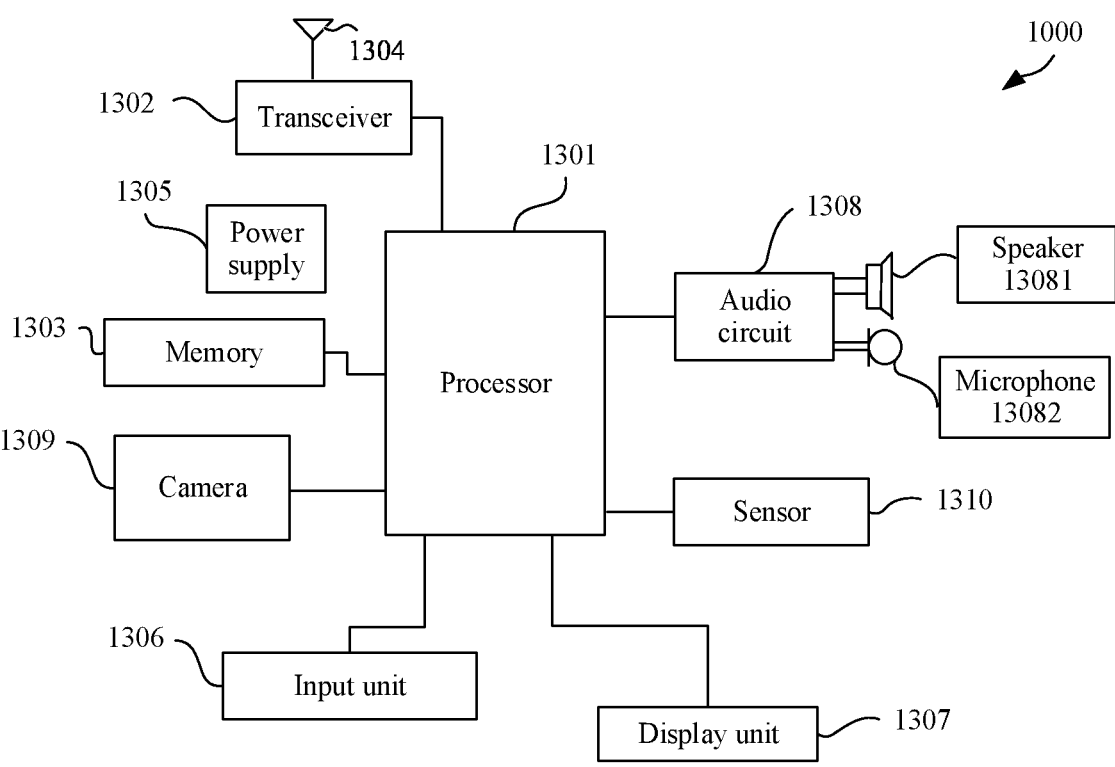
FIG. 13 is a schematic diagram of a structure of another terminal device according to an embodiment of this application.

If the communication device shown in FIG. 12 is the terminal 1000, the terminal 1000 may be in a structure shown in FIG. 13. As shown in FIG. 13, the terminal 1000 includes a processor 1301 and a transceiver 1302. Optionally, the terminal 1000 further includes a memory 1303. The processor 1301, the transceiver 1302, and the memory 1303 may communicate with each other through a bus, to transfer a control signal and/or a data signal. The memory 1303 is configured to store a computer program, and the processor 1301 is configured to invoke the computer program from the memory 1303 and run the computer program, to control the transceiver 1302 to send and receive a signal.

Optionally, the terminal 1000 may further include an antenna 1304 configured to send, using a radio signal, information or data output by the transceiver 1302.

The processor 1301 and the memory 1303 may be integrated into one processing apparatus. The processor 1301 is configured to execute program code stored in the memory 1303 to implement the foregoing functions. During implementation, the memory 1303 may alternatively be integrated into the processor 1301, or may be independent of the processor 1301.

Optionally, the terminal 1000 may further include a power supply 1305 configured to supply power to various components or circuits in the terminal device.

In addition, the terminal 1000 may further include one or more of an input unit 1306, a display unit 1307, an audio circuit 1308, a camera 1309, a sensor 1310, and the like, to better improve functions of the terminal device. The audio circuit may further include a speaker 13081, a microphone 13082, and the like.

An embodiment of this application further provides a chip system 1400, including at least one processor 1401 and an interface circuit 1402, where the processor 1401 is connected to the interface circuit 1402.

The processor 1401 may be an integrated circuit chip and has a signal processing capability. In an implementation process, steps in the foregoing methods may be implemented using a hardware integrated logic circuit in the processor 1401 or using instructions in a form of software. The processor 1401 may be a general-purpose processor, a DSP, an ASIC, an FPGA, or another programmable logic device, a discrete gate or a transistor logic device, or a discrete hardware component. The processor 1401 may implement or perform the methods and steps that are disclosed in the embodiments of this application. The general-purpose processor may be a microprocessor, or the processor may be any conventional processor or the like.

The interface circuit 1402 may send or receive data, instructions, or information. The processor 1401 may process data, instructions, or other information received through the interface circuit 1402, and send, through the interface circuit 1402, information obtained through processing.

Optionally, the chip system further includes a memory 1403. The memory 1403 may include a read-only memory (ROM) and a random-access memory (RAM), and provide operation instructions and data for the processor 1401. A part of the memory 1403 may further include a non-volatile random-access memory (NVRAM).

Optionally, the memory 1403 stores an executable software module or a data structure, and the processor 1401 may perform a corresponding operation by invoking the operation instructions (the operation instructions may be stored in an operating system) stored in the memory.

Optionally, the chip system may be used in the mobility management network element, the terminal, or the data management network element in the embodiments of this application. Optionally, the interface circuit 1402 is configured to perform receiving and sending steps performed by a device, for example, the mobility management network element, the terminal, or the data management network element, in the embodiments shown in FIG. 4 to FIG. 7A and FIG. 7B. The processor 1401 is configured to perform a processing step performed by the device, for example, the mobility management network element, the terminal, or the data management network element, in the embodiments shown in FIG. 4 to FIG. 7A and FIG. 7B. The memory 1403 is configured to store data and instructions of the device, for example, the mobility management network element, the terminal, or the data management network element, in the embodiments shown in FIG. 4 to FIG. 7A and FIG. 7B.

An embodiment of this application further provides a computer-readable storage medium. The methods described in the foregoing method embodiments may be all or partially implemented using software, hardware, firmware, or any combination thereof. If the methods are implemented in software, functions used as one or more instructions or code may be stored in the computer-readable medium or transmitted on the computer-readable medium. The computer-readable medium may include a computer storage medium and a communication medium, and may further include any medium capable of transferring a computer program from one place to another. The storage medium may be any available medium accessible to a computer.

In an optional design, the computer-readable medium may include a RAM, a ROM, an electrically erasable programmable ROM (EEPROM), a compact disc (CD)-ROM or another optical disc memory, a magnetic disk memory or another magnetic storage device, or any other medium that may be used to carry or store required program code in a form of an instruction or a data structure and that is accessible to a computer. In addition, any connection is appropriately referred to as a computer-readable medium. For example, if software is transmitted from a website, a server, or another remote source using a coaxial cable, a fiber optical cable, a twisted pair, a digital subscriber line (DSL), or wireless technologies (for example, infrared ray, radio, and microwave), the coaxial cable, the fiber optical cable, the twisted pair, the DSL, or the wireless technologies such as infrared ray, radio and microwave are included in the definition of a medium. Disks and discs used in this specification include a compact disc (CD), a laser disc, an optical disc, a digital versatile disc (DVD), a floppy disk, and a Blu-ray disc, where the disks usually reproduce data magnetically, and the discs reproduce data optically with lasers. The combination described above should also be included in the scope of the computer-readable medium.

An embodiment of this application further provides a computer program product. The methods described in the foregoing method embodiments may be all or partially implemented using software, hardware, firmware, or any combination thereof. If the methods are implemented in software, the methods may be implemented all or partially in a form of the computer program product. The computer program product includes one or more computer instructions. When the computer program instructions are loaded and executed on a computer, the procedures or functions described according to the foregoing method embodiments are all or partially generated. The computer may be a general-purpose computer, a special-purpose computer, a computer network, a network device, user equipment, or another programmable apparatus.

The objectives, technical solutions, and benefits of this application are further described in detail in the foregoing implementations. It should be understood that the foregoing description is merely implementations of this application, but is not intended to limit the protection scope of this application. Any modification, equivalent replacement or improvement made based on the technical solutions of this application shall fall within the protection scope of this application.

What is claimed is:

1. A method, comprising:
obtaining, by a data management network element of a first telecommunications network, an identity of a terminal; and
sending, by the data management network element of the first telecommunications network, based on subscription data of the terminal indicating that external authentication needs to be performed on the terminal, and to a mobility management network element or an authentication server function network element of the first telecommunications network, external authentication indication information and a third-party identifier identifying an external entity in a second telecommunications network to perform the external authentication on the terminal,
wherein the external authentication indication information indicates to perform the external authentication on the terminal, and
wherein the external authentication is from the external entity that is external to the first telecommunications network.

2. The method of claim 1, wherein obtaining the identity of the terminal comprises:
receiving, by the data management network element, the identity of the terminal from the authentication server function network element; or
receiving, by the data management network element, the identity of the terminal from the mobility management network element.

3. The method of claim 1, further comprising detecting, by the data management network element and based on an external service authentication indication in the subscription data of the terminal, that the external authentication needs to be performed on the terminal.

4. The method of claim 1, wherein the identity of the terminal is a subscription permanent identifier (SUPI).

5. A method, comprising:
obtaining, by a data management network element of a first telecommunications network, an identity of a terminal;
sending, by the data management network element of the first telecommunications network based on subscription data of the terminal indicating that external authentication needs to be performed on the terminal, and to an authentication server function network element of the first telecommunications network, external authentication indication information and a third-party identifier identifying an external entity in a second telecommunications network to perform the external authentication on the terminal, wherein the external authentication indication information indicates to perform external authentication on the terminal, and wherein the external authentication is from the external entity that is external to the first telecommunications network; and receiving, by the authentication server function network element, the external authentication indication information.

6. The method of claim 5, wherein obtaining the identity of the terminal comprises:

receiving, by the data management network element, the identity of the terminal from the authentication server function network element; or receiving, by the data management network element, the identity of the terminal from a mobility management network element.

7. The method of claim 5, further comprising detecting, by the data management network element and based on an external service authentication indication in the subscription data of the terminal, that the external authentication needs to be performed on the terminal.

8. The method of claim 5, wherein the identity of the terminal is a subscription permanent identifier (SUPI).

9. A data management network element of a first telecommunications network, comprising:

one or more processors; and a memory coupled to the one or more processors and configured to store instructions for execution by the one or more processors to cause the data management network element to:

obtain an identity of a terminal; and send, by the data management network element of the first telecommunications network, based on subscription data of the terminal indicating that external authentication needs to be performed on the terminal, and to a mobility management network element or an authentication server function network element of the first telecommunications network, external authentication indication information and a third-party identifier identifying an external entity in a second telecommunications network to perform the external authentication on the terminal, wherein the external authentication indication information indicates to perform the external authentication on the terminal, and wherein the external authentication is from the external entity that is external to the first telecommunications network of the data management network element.

10. The data management network element of claim 9, wherein the instructions are executable by the one or more processors to further cause the data management network element to:

receive the identity of the terminal from the authentication server function network element; or receive the identity of the terminal from the mobility management network element.

11. The data management network element of claim 9, wherein the instructions are executable by the one or more processors to further cause the data management network element to detect, based on an external service authentication indication in the subscription data of the terminal, that the external authentication needs to be performed on the terminal.

12. The data management network element of claim 9, wherein the identity of the terminal is a subscription permanent identifier (SUPI).

13. A system, comprising:

a data management network element of a first telecommunications network comprising:

a first memory configured to store first instructions; and one or more first processors coupled to the first memory and configured to execute the first instructions to:

obtain an identity of a terminal; and send, based on subscription data of the terminal indicating that external authentication needs to be performed on the terminal, external authentication indication information and a third-party identifier identifying an external entity in a second telecommunications network to perform the external authentication on the terminal, wherein the external authentication indication information indicates to perform the external authentication on the terminal, and wherein the external authentication is from the external entity that is external to the first telecommunications network; and an authentication server function network element of the first telecommunications network comprising:

a second memory configured to store second instructions; and one or more second processors coupled to the second memory and configured to execute the second instructions to receive the external authentication indication information and the third-party identifier from the data management network element of the first telecommunications network.

14. The system of claim 13, wherein the one or more first processors are further configured to execute the first instructions to:

receive the identity of the terminal from the authentication server function network element; or receive the identity of the terminal from a mobility management network element.

15. The system of claim 13, wherein the one or more first processors are further configured to execute the first instructions to detect that the external authentication needs to be performed on the terminal based on an external service authentication indication in the subscription data of the terminal.

16. The system of claim 13, wherein the identity of the terminal is a subscription permanent identifier (SUPI).

17. The method of claim 1, wherein the first telecommunications network comprises a Long-Term Evolution (LTE) network or a fifth generation (5G) network, and wherein the mobility management network element comprises a mobility management entity (MME) in the LTE network or an access and mobility management function (AMF) in the 5G network.

18. The method of claim 1, wherein the third-party identifier comprises a network access identifier (NAI), a data network name (DNN), a service provided identifier (SP-ID), or single network slice selection assistance information (S-NSSAI).

19. The method of claim 1, wherein the terminal comprises a remote terminal, an industrial and enterprise device, an Internet of things (IoT) device, or an enhanced Mobile Broadband (eMBB).

20. The method of claim 1, wherein the external entity is an authentication, authorization, and accounting server.

21. The method of claim 1, wherein the first telecommunications network comprises a Long-Term Evolution (LTE)

network, a fifth generation (5G) network, or a non-public network (NPN), and wherein the second telecommunications network comprises a public land mobile network (PLMN) or a Data Network.

22. The method of claim 21, wherein the identity of the terminal is a subscription permanent identifier (SUPI), wherein the mobility management network element comprises a mobility management entity (MME) in the LTE network or an access and mobility management function (AMF) in the 5G network, wherein the third-party identifier comprises a network access identifier (NAI), a data network name (DNN), a service provided identifier (SP-ID), or single network slice selection assistance information (S-NSSAI), wherein the terminal comprises a remote terminal, an industrial and enterprise device, an Internet of things (IoT) device, or an enhanced Mobile Broadband (eMBB), and wherein the external entity is an authentication, authorization, and accounting server.

* * * * *